（12）United States Patent
Jung et al.

(10) Patent No.: US 8,659,339 B2
(45) Date of Patent: Feb. 25, 2014

(54) OFFSET CANCELING CIRCUIT, SAMPLING CIRCUIT AND IMAGE SENSOR

(75) Inventors: Wun-Ki Jung, Suwon-si (KR); Kwi-Sung Yoo, Seoul (KR); Min-Ho Kwon, Seoul (KR); Jae-Hong Kim, Daegu (KR); Seung-Hyun Lim, Yongin-si (KR); Yu-Jin Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 259 days.

(21) Appl. No.: 13/272,723

(22) Filed: Oct. 13, 2011

(65) Prior Publication Data
US 2012/0133800 A1    May 31, 2012

(30) Foreign Application Priority Data

Nov. 29, 2010    (KR) .......................... 10-2010-0119676

(51) Int. Cl.
*H03L 5/00* (2006.01)
(52) U.S. Cl.
USPC ............... 327/307; 348/241; 327/91; 327/92; 327/93; 327/94; 327/95

(58) Field of Classification Search
USPC ............................... 348/241; 257/307, 91–96
See application file for complete search history.

(56) References Cited

U.S. PATENT DOCUMENTS

| 5,898,395 | A | * | 4/1999 | Werrbach et al. ............. 341/118 |
| 6,208,199 | B1 | * | 3/2001 | Andersson ..................... 327/561 |
| 7,088,147 | B2 | * | 8/2006 | Prasad et al. .................... 327/91 |
| 2007/0188639 | A1 | | 8/2007 | Koifman et al. |
| 2008/0197887 | A1 | * | 8/2008 | Uchida ............................. 327/72 |
| 2010/0277624 | A1 | * | 11/2010 | Tan et al. ...................... 348/244 |
| 2012/0175500 | A1 | * | 7/2012 | Saito .......................... 250/208.1 |

FOREIGN PATENT DOCUMENTS

| JP | 05-252445 | 9/1993 |
| JP | 2007-060350 | 3/2007 |
| JP | 2008-124713 | 5/2008 |

* cited by examiner

*Primary Examiner* — Antoinette Spinks
(74) *Attorney, Agent, or Firm* — Myers Bigel Sibley & Sajovec

(57) ABSTRACT

An offset canceling circuit stores charge corresponding to a voltage difference between a reset voltage received from a unit pixel and a reference voltage, thereby canceling an offset of the unit pixel.

3 Claims, 33 Drawing Sheets

1000

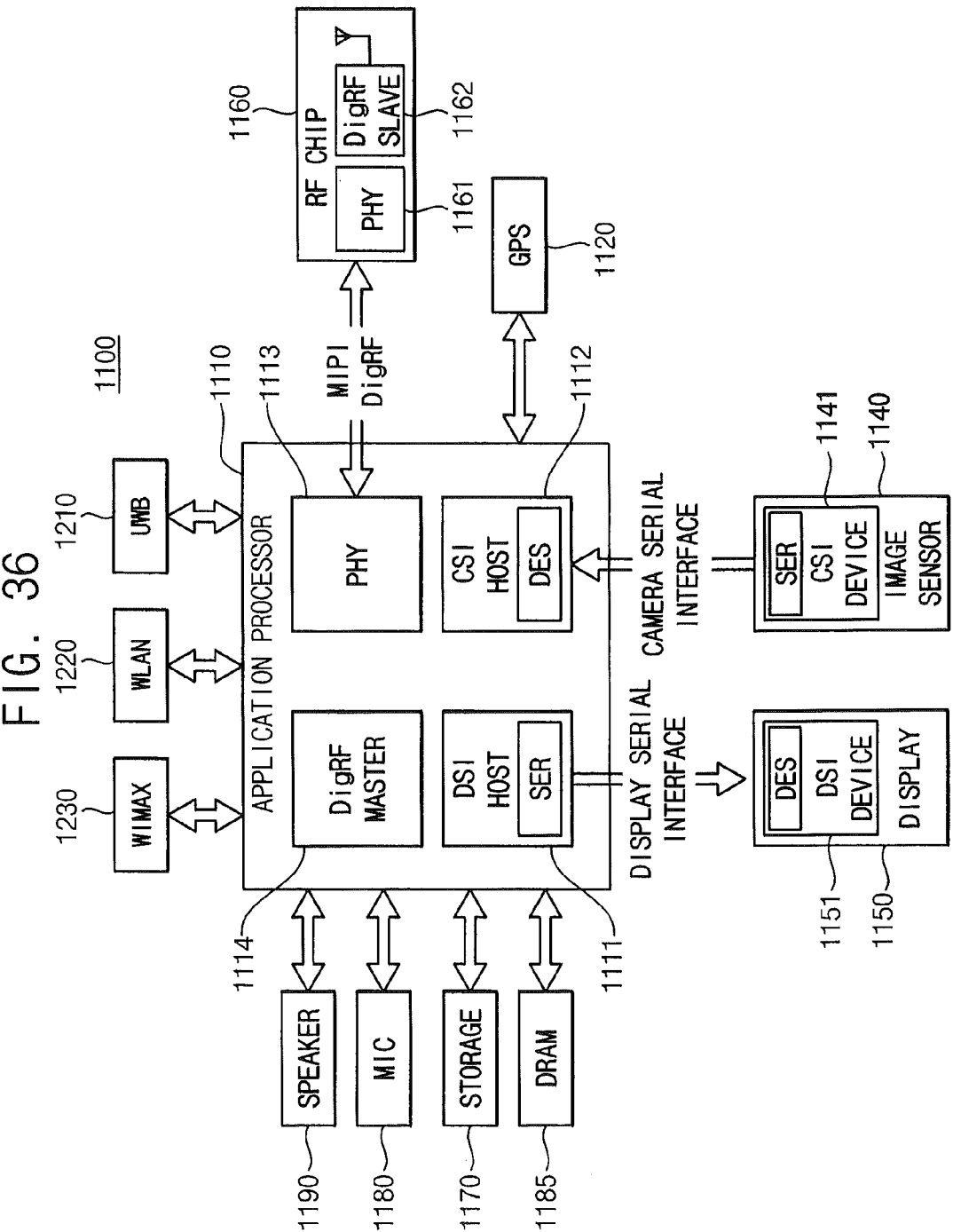

OFFSET CANCELING CIRCUIT, SAMPLING CIRCUIT AND IMAGE SENSOR

CROSS-REFERENCE TO RELATED APPLICATIONS

This U.S. non-provisional application claims the benefit of priority under 35 U.S.C. §119 to Korean Patent Application No. 10-2010-0119676 filed on Nov. 29, 2010 in the Korean Intellectual Property Office (KIPO), the entire content of which is incorporated herein by reference in its entirety.

BACKGROUND

1. Technical Field

Example embodiments relate to offset canceling circuits, sampling circuits and image sensors. More particularly, example embodiments relate to offset canceling circuits, sampling circuits, and image sensors capable of canceling an offset of a unit cell.

2. Description of the Related Art

In a sensor device including a unit cell array that outputs an electrical signal by sensing an efficient physical quantity, such as intensity of light, temperature, mass, time, etc., an offset may exist between unit cells due to difference of environmental conditions, such as a process variation, a voltage variation, a temperature variation, etc. Because of such an offset, the accuracy of the sensor device may be deteriorated.

SUMMARY

According to example embodiments, an offset canceling circuit includes a decoupling capacitor, a buffer and a feedback circuit. The decoupling capacitor has a first electrode coupled to a unit cell, which outputs one of a reset voltage and a data voltage based on a state of the unit cell, and a second electrode. The buffer is coupled to the second electrode. The feedback circuit is coupled to the second electrode and an output terminal of the buffer. The feedback circuit receives a reference voltage, and provides the second electrode with the reference voltage to store charge corresponding to a first voltage in the decoupling capacitor. The first voltage corresponds to a voltage difference between the reset voltage and the reference voltage.

In some embodiments, the buffer may output a second voltage corresponding to a voltage difference between the data voltage and the first voltage when the unit cell outputs the data voltage.

In some embodiments, the buffer may include a transistor having a gate coupled to the second electrode, a drain coupled to a first power supply voltage, and a source coupled to the output terminal of the buffer, and a current source coupled between the output terminal of the buffer and a second power supply voltage.

In some embodiments, the buffer may include an amplifier having a non-inverting input terminal coupled to the second electrode and an inverting input terminal coupled to the output terminal of the buffer.

In some embodiments, the feedback circuit may include an amplifier having a non-inverting input terminal to which the reference voltage is applied and an inverting terminal coupled to the output terminal of the buffer, and a first switch configured to control a connection between the second electrode and the amplifier.

In some embodiments, the first switch may couple the second electrode to the amplifier during a predetermined period of time when the unit cell outputs the reset voltage.

In some embodiments, the feedback circuit may further include an amplifier offset capacitor having a third electrode coupled to the inverting input terminal of the amplifier and a fourth electrode, a second switch configured to control a connection between the fourth electrode and the output terminal of the buffer, a third switch configured to control a connection between the fourth electrode and the non-inverting input terminal of the amplifier, and a fourth switch configured to control a connection between the inverting input terminal of the amplifier and an output terminal of the amplifier.

In some embodiments, the amplifier offset capacitor may store charge corresponding to a third voltage, and the third voltage may correspond to a voltage difference between an output voltage of the amplifier and the reference voltage.

In some embodiments, the first switch and the second switch may be controlled by a first switching signal, and the third switch and the fourth switch may be controlled by a second switching signal.

According to example embodiments, a sampling circuit includes an offset canceling circuit and an analog-to-digital converter. The offset canceling circuit receives one of a reset voltage and a data voltage from a unit cell based on a state of the unit cell, receives a reference voltage, and includes a decoupling capacitor that stores charge corresponding to a first voltage. The first voltage corresponds to a voltage difference between the reset voltage and the reference voltage. The offset canceling circuit generates a second voltage based on the data voltage and the first voltage. The analog-to-digital converter is configured to perform a signal conversion operation that converts the second voltage into a digital output signal.

In some embodiments, the analog-to-digital converter may be further configured to perform a reference conversion operation that converts the reference voltage into a reference digital output signal.

In some embodiments, the decoupling capacitor may have a first electrode coupled to the unit cell and a second electrode. The offset canceling circuit may further include a buffer coupled to the second electrode, and a feedback circuit coupled to the second electrode and an output terminal of the buffer. The feedback circuit may receive the reference voltage, and may provide the second electrode with the reference voltage to store the charge corresponding to the first voltage in the decoupling capacitor.

In some embodiments, the offset canceling circuit and the analog-to-digital converter may share an amplifier.

In some embodiments, the offset canceling circuit may further include an amplifier offset capacitor to store an offset of the amplifier.

According to example embodiments, an image sensor includes a plurality of unit pixels, a plurality of offset canceling circuits and an analog-to-digital conversion unit. The plurality of unit pixels is arranged in a matrix form having a plurality of rows and a plurality of columns. The plurality of unit pixels output a plurality of reset voltages and a plurality of data voltages based on states of the plurality of unit pixels. The plurality of offset canceling circuits is coupled to the plurality of unit pixels. The plurality of offset canceling circuits receive a reference voltage and include a plurality of decoupling capacitors that store charge corresponding to a plurality of first voltages, respectively. Each first voltage corresponds to a voltage difference between a corresponding one of the plurality of reset voltages and the reference voltage. The plurality of offset canceling circuits generates a plurality of second voltages based on the plurality of the data voltages and the plurality of the first voltages, respectively. The analog-to-digital conversion unit converts the plurality of second voltages into a plurality of digital output signals.

In some embodiments, the analog-to-digital conversion unit may include a plurality of analog-to-digital converters respectively coupled to the plurality of columns. The plurality of analog-to-digital converters may be configured to substantially simultaneously convert the plurality of second voltages into the plurality of digital output signals.

In some embodiments, the analog-to-digital conversion unit may include one analog-to-digital converter. The analog-to-digital converter may be configured to sequentially convert the plurality of second voltages into the plurality of digital output signals.

In some embodiments, at least two of the plurality of the unit pixels may share at least one of a reset transistor, a drive transistor and a select transistor.

In some embodiments, the image sensor may further include a plurality of additional offset canceling circuits respectively coupled to the plurality of columns. A first row of the plurality of the unit pixels and a second row of the plurality of the unit pixels are configured to substantially simultaneously output the plurality of data voltages to the plurality of offset canceling circuits and the plurality of additional offset canceling circuits, respectively.

In some embodiments, the plurality of offset canceling circuits and the plurality of additional offset canceling circuits may receive substantially the same reference voltage.

BRIEF DESCRIPTION OF THE DRAWINGS

Illustrative, non-limiting example embodiments will be more clearly understood from the following detailed description taken in conjunction with the accompanying drawings.

FIG. 36 is a block diagram illustrating an example of an interface used in a computing system of FIG. 35.

DETAILED DESCRIPTION

Figure 1:
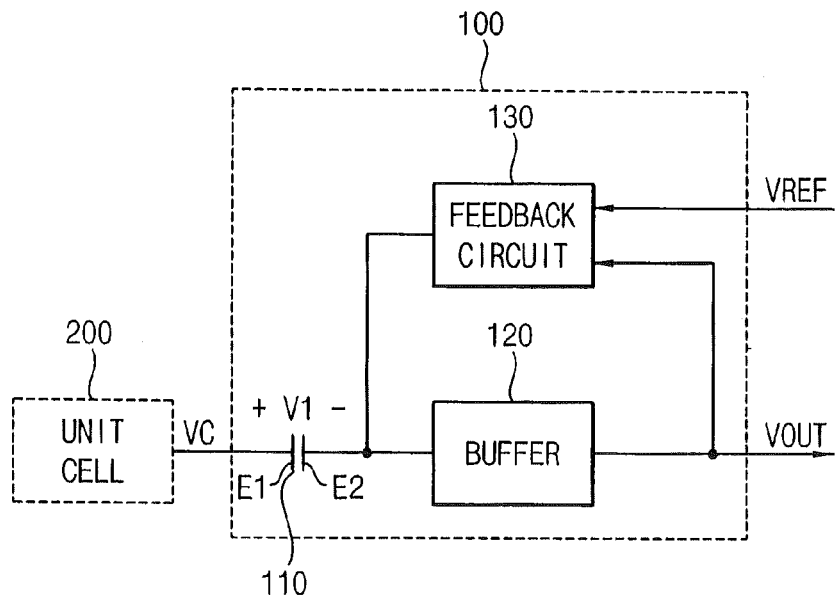
FIG. 1 is a block diagram illustrating an offset canceling circuit according to example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Figure 2:
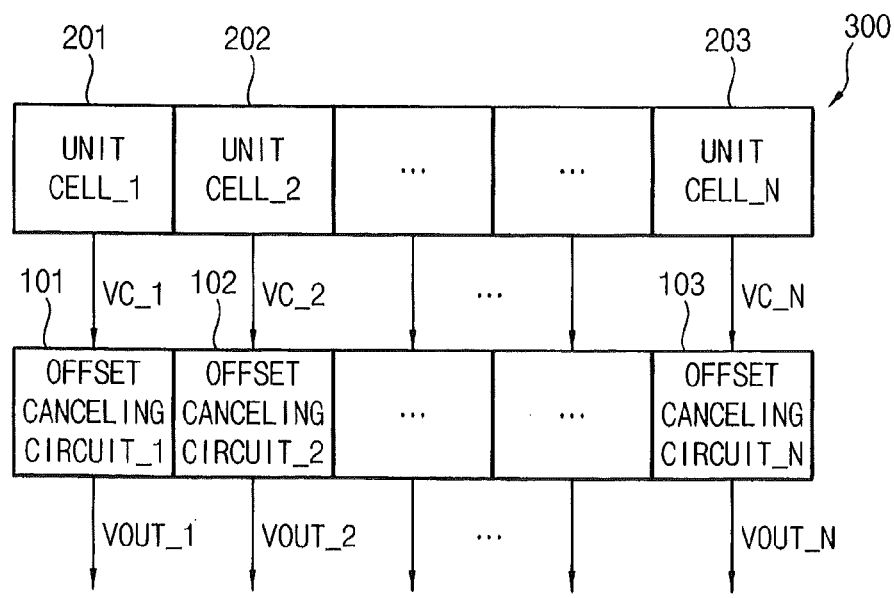
FIG. 2 is a diagram illustrating an example where an offset canceling circuit of FIG. 1 is coupled to a cell array.
Figure 3:
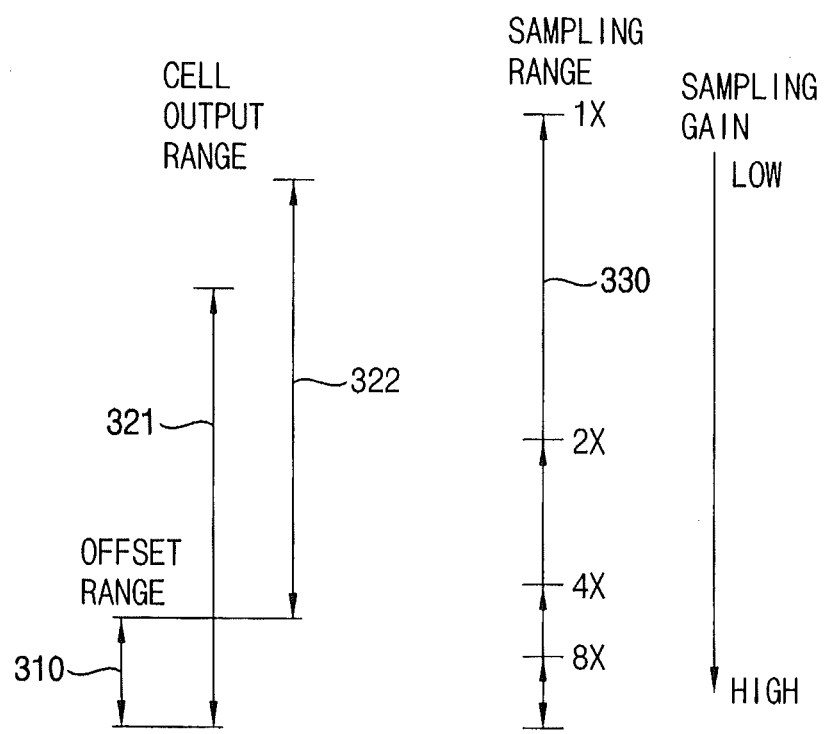
FIG. 3 is a diagram illustrating a range of outputs of a cell array of FIG. 2 and a sampling range.

FIG. 1 is a block diagram illustrating an offset canceling circuit according to example embodiments, FIG. 2 is a diagram illustrating an example where an offset canceling circuit of FIG. 1 is coupled to a cell array, and FIG. 3 is a diagram illustrating a range of outputs of a cell array of FIG. 2 and a sampling range.

Referring to FIG. 1, an offset canceling circuit 100 includes a decoupling capacitor 110, a buffer 120 and a feedback circuit 130.

A first electrode E1 of the decoupling capacitor 110 may be coupled to a unit cell 200. The unit cell 200 may output as a cell voltage VC a reset voltage before sensing and a data voltage after sensing. The reset voltage and the data voltage may not have an AC component, and may have only a DC component. For example, the unit cell 200 may be an element of a sensor that outputs an electrical signal by sensing a physical quantity, such as intensity of light, temperature, mass, time, etc.

The buffer 120 may be coupled to a second electrode E2 of the decoupling capacitor 110. The buffer 120 may be a voltage buffer that outputs a voltage of the second electrode E2 as an output voltage VOUT. For example, the buffer 120 may have high input impedance and low output impedance.

The feedback circuit 130 may have an input terminal coupled to an output terminal of the buffer 120, and an output terminal coupled to the second electrode E2 of the decoupling capacitor 110. The feedback circuit 130 may receive a reference voltage VREF from an external circuit (not shown). While the unit cell 200 outputs the reset voltage as the cell voltage VC, the feedback circuit 130 may provide the second electrode E2 of the decoupling capacitor with the reference voltage VREF until the output voltage VOUT reaches the reference voltage VREF. Accordingly, the decoupling capacitor 110 may store charge corresponding to a first voltage V1, and the first voltage V1 may correspond to a voltage difference between the reset voltage received from the unit cell 200 and the reference voltage VREF.

Referring to FIG. 2, a plurality of offset canceling circuits 101, 102 and 103 are respectively coupled to a plurality of columns of a cell array 300 including a plurality of unit cells 201, 202 and 203. In some embodiments, the cell array 300 may include an image sensor that measures intensity of light, a temperature sensor that measures temperature, a mass sensor that measures mass, an X-ray inspection device that senses X-rays, a scanner that senses reflected light, etc. Although FIG. 2 illustrates the cell array 300 including the plurality of unit cells 201, 202 and 203 that are arranged in a one-dimensional array corresponding to one row, in some embodiments, the cell array 300 may include a plurality of unit cells that are arranged in two-dimensional matrix form, or may include a plurality of unit cells that are arranged in a three-dimensional array.

Referring to FIGS. 2 and 3, when the plurality of unit cells 201, 202 and 203 included in the cell array 300 output a plurality of reset voltages as a plurality of cell voltages VC_1, VC_2 and VC_N, the plurality of reset voltages may be different from each other, and may have an offset 310 having a predetermined range. Because the plurality of reset voltages have the offset 310, the plurality of unit cells 201, 202 and 203 may output different data voltages with respect to the same physical quantity.

For example, in a case where a first unit cell 201 outputs the minimum reset voltage, and a second unit cell 202 outputs the maximum reset voltage, a range 321 of a data voltage output from the first unit cell 201 is different from a range 322 of a data voltage output from the second unit cell 202, and the data voltage of the first unit cell 201 is lower by the offset 310 than the data voltage of the second unit cell 202 with respect to the same physical quantity. Accordingly, the accuracy of a sensor device may be deteriorated because of the offset 310. Further, a sampling range 330 of the sensor device decreases as a sampling gain of the sensor device increases, and the offset 301 may occupy most of the sampling range 330 in a case where the sampling gain is high. Accordingly, if the sensor device does not include the plurality of offset canceling circuits 101, 102 and 103, the sensor device may output only the offset as a sensed electrical signal, and may not properly work.

Referring again to FIG. 1, when the unit cell 200 outputs the reset voltage as the cell voltage VC, the reset voltage may be applied to the first electrode E1 of the decoupling capacitor 110. The feedback circuit 130 may apply the reference voltage VREF to the second electrode E2. Accordingly, the decoupling capacitor 110 may store charge corresponding to the first voltage V1 (i.e., the voltage difference between the reset voltage and the reference voltage VREF).

The reset voltage may include not only a desired reset voltage but also an offset, and the first voltage V1 may be a subtraction of the reference voltage VREF from a sum of the desired reset voltage and the offset. The data voltage may include not only a desired data voltage (i.e. a sum of the desired reset voltage and a sensing voltage) but also the offset. While the unit cell 200 outputs the data voltage, the offset canceling circuit 100 may generate a second voltage corresponding to a voltage difference between the data voltage and the first voltage V1. Because the second voltage is a subtraction of the first voltage V1 from the data voltage, the second voltage may be calculated by subtracting the desired reset voltage from the desired data voltage and adding the reference voltage VREF to a result (i.e., the sensing voltage) of the subtraction, and thus may not include the offset. Accordingly, if the second voltage is converted into a digital output signal using the reference voltage VREF as a reference point, a digital value corresponding to the sensing voltage where the offset is canceled may be output as the digital output signal.

Referring again to FIG. 2, because the plurality of offset canceling circuits 101, 102 and 103 cancel offsets of the plurality of cell voltages VC_1, VC_2 and VC_N output from the plurality of unit cells 201, 202 and 203, a plurality of output voltages VOUT_1, VOUT_2 and VOUT_N may be sums of the reference voltage VREF and voltage differences (i.e., sensing voltages) between desired data voltages and desired reset voltages, respectively. That is, the offsets of the plurality of unit cells 201, 202 and 203 may be canceled in the plurality of output voltages VOUT_1, VOUT_2 and VOUT_N.

Figure 4:
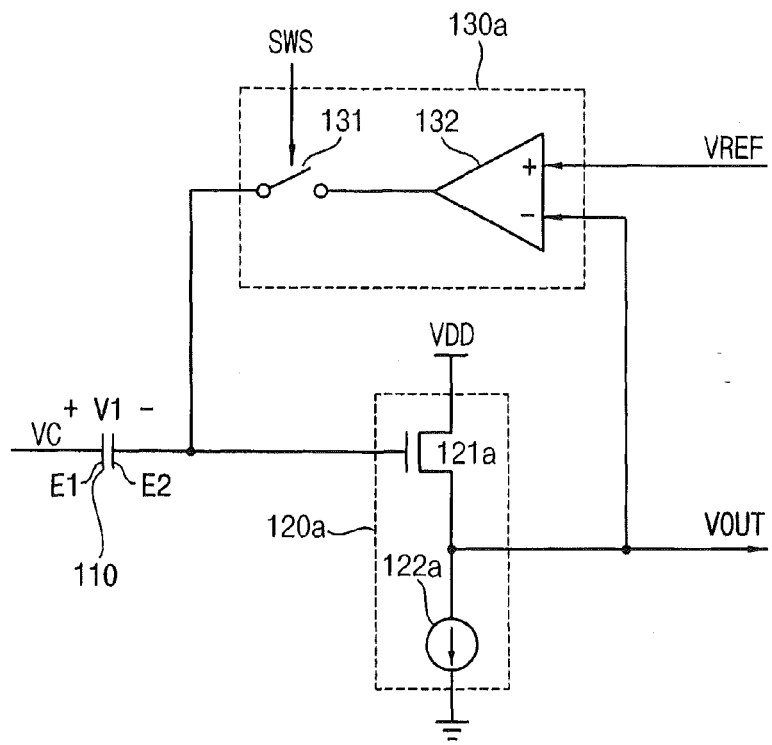
FIG. 4 is a circuit diagram illustrating an offset canceling circuit according to example embodiments.

FIG. 4 is a circuit diagram illustrating an offset canceling circuit according to example embodiments.

Referring to FIG. 4, an offset canceling circuit 100a includes a decoupling capacitor 110, a buffer 120a and a feedback circuit 130a.

The buffer 120a may be implemented as a source follower including a transistor 121a and a current source 122a. The transistor 121a may have a gate coupled to a second electrode E2 of the decoupling capacitor 110, a drain coupled to a first power supply voltage VDD, and a source coupled to an output terminal of the buffer 120a. The current source 122a may be coupled between the output terminal of the buffer 120a and a second power supply voltage (e.g., a ground voltage). In some embodiments, the current source 122a may be implemented with a passive element, such as a resistor, and/or an active element, such as a transistor. The buffer 120a implemented as the source follower may have a voltage gain of about 1.

The feedback circuit 130a may include a switch 131 and an amplifier 132. One end of the switch 131 may be coupled to the second electrode E2 of the decoupling capacitor 110, and the other end of the switch 131 may be coupled to an output terminal of the amplifier 132. The switch 131 may control a connection between the second electrode E2 of the decoupling capacitor 110 and the output terminal of the amplifier 132 in response to a switching signal SWS. The amplifier 132 may have a non-inverting input terminal to which a reference voltage VREF is applied from an external circuit (not shown), an inverting input terminal coupled to the output terminal of the buffer 120a, and an output terminal coupled to the switch 131. While the switch 131 is turned on, the amplifier 132 may provide the second electrode E2 of the decoupling capacitor 110 with the reference voltage VREF so that an output voltage VOUT may reach the reference voltage VREF.

Figure 5:
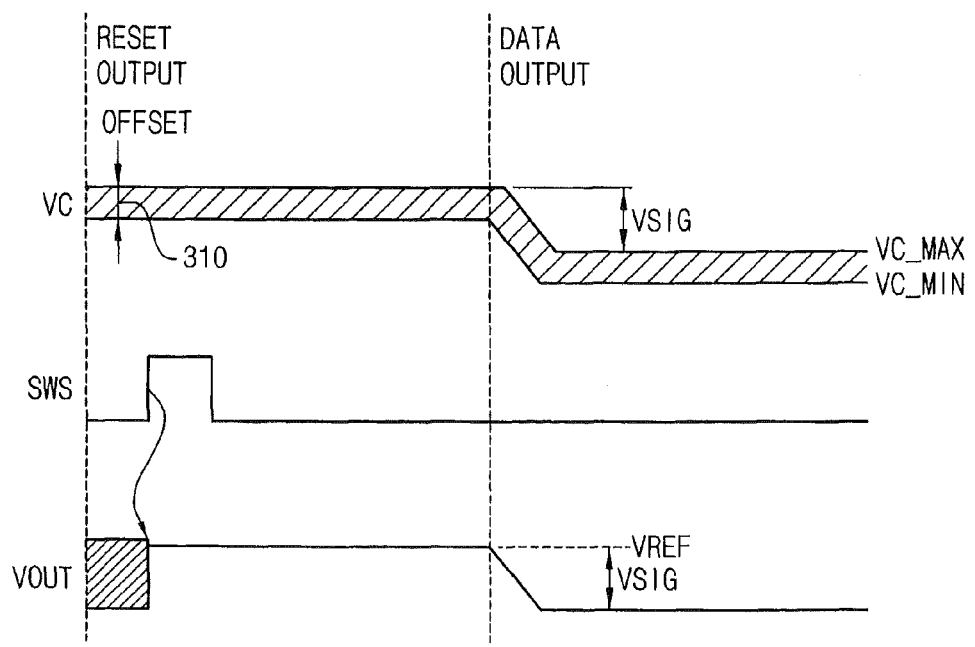
FIG. 5 is a timing diagram for describing an operation of an offset canceling circuit of FIG. 4.

FIG. 5 is a timing diagram for describing an operation of an offset canceling circuit of FIG. 4.

Referring to FIGS. 4 and 5, even if a plurality of unit cells sense the same physical quantity, cell voltages VC output from the plurality of unit cells may be distributed in a range 310. That is, a predetermined offset 310 may exist between the maximum cell voltage VC_MAX and the minimum cell voltage VC_MIN.

When a reset voltage is output as one cell voltage VC, the reset voltage is applied to a first electrode E1 of a decoupling capacitor 110. While a switching signal SWS has a logic high level, a switch 131 is turned on in response to the switching signal SWS. If the switch is turned on 131, an amplifier 132 may provide charge to the decoupling capacitor 110 based on a voltage difference between an output voltage VOUT and a reference voltage VREF until the output voltage VOUT reaches the reference voltage VREF. Accordingly, the decoupling capacitor 110 may store charge corresponding to a first voltage V1, which corresponds to a voltage difference between the reset voltage and the reference voltage VREF, and a buffer 120a may output the output voltage VOUT having the same voltage level as the reference voltage VREF. Thus, although a plurality of reset voltages output from the plurality of unit cells have the offset 310, a plurality of output voltages VOUT output from a plurality of offset canceling circuits may have substantially the same voltage level.

When a data voltage, which is increased or decreased by a sensing voltage VSIG from the reset voltage, is output as one cell voltage VC, the data voltage may be applied to the first electrode E1 of the decoupling capacitor 110. Because the decoupling capacitor 110 stores the charge corresponding to the voltage difference (i.e., the first voltage V1) between the reset voltage and the reference voltage VREF, a second electrode E2 of the decoupling capacitor 110 may have a second voltage corresponding to a voltage difference between the data voltage and the first voltage V1. The second voltage may be a voltage that is increased or decreased by the sensing voltage VSIG from the reference voltage VREF, and the buffer 120a may output the second voltage as the output voltage VOUT. Even if sensing voltages VSIG for the plurality of the unit cells may have the same voltage level, a plurality of data voltages output from the plurality of the unit cells may have the offset 310. However, because the plurality of offset canceling circuits may cancel the offset 310 of the plurality of the unit cells, the plurality of offset canceling circuits may output the plurality of output voltages VOUT where the offset 310 is canceled, or voltages increased or decreased by the sensing voltage VSIG from the reference voltage VREF.

Figure 6:
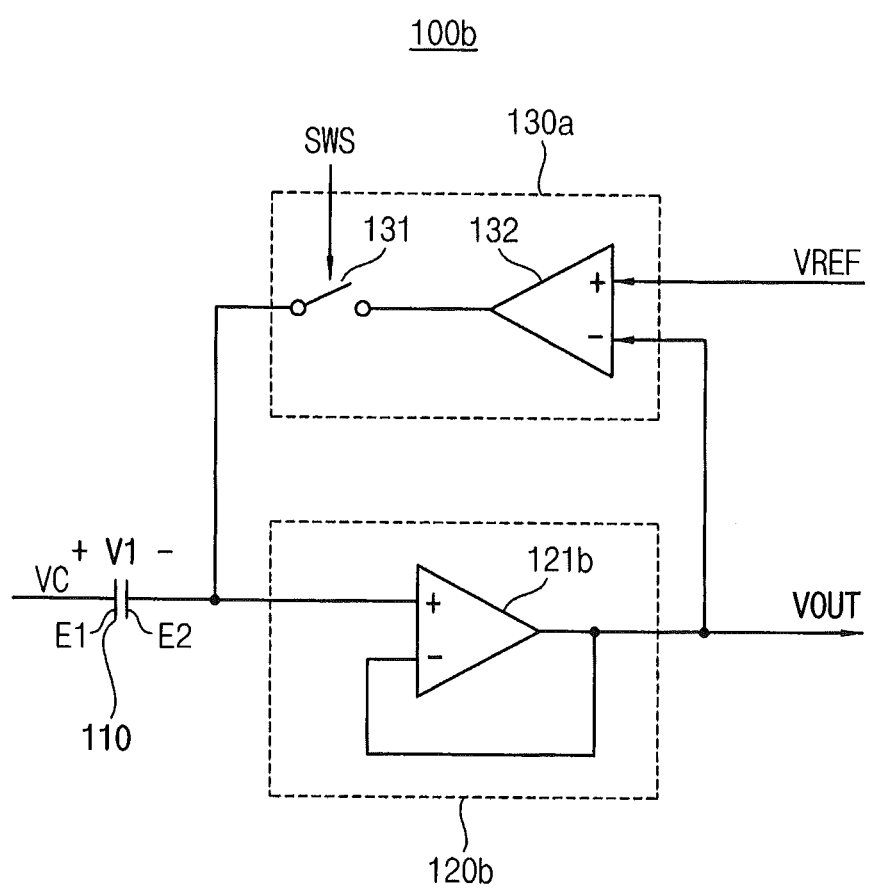
FIG. 6 is a circuit diagram illustrating an offset canceling circuit according to example embodiments.

FIG. 6 is a circuit diagram illustrating an offset canceling circuit according to example embodiments.

Referring to FIG. 6, an offset canceling circuit 100b includes a decoupling capacitor 110, a buffer 120b and a feedback circuit 130a. The offset canceling circuit 100b of FIG. 6 may have a configuration substantially similar to that of an offset canceling circuit 100a of FIG. 4 except for a configuration of the buffer 120b.

The buffer 120b includes an amplifier 121b. The amplifier 121b may have a non-inverting input terminal coupled to a second electrode E2 of the decoupling capacitor 110, and an inverting input terminal and an output terminal that are coupled to each other. The amplifier 121b may increase an output voltage VOUT based on a voltage difference between a voltage of the second electrode E2 and the output voltage VOUT until the output voltage VOUT reaches the voltage of the second electrode E2. Thus, the buffer 120b including the amplifier 121b may have a voltage gain of about 1. The amplifier 121b may have high input impedance and low output impedance.

Figure 7:
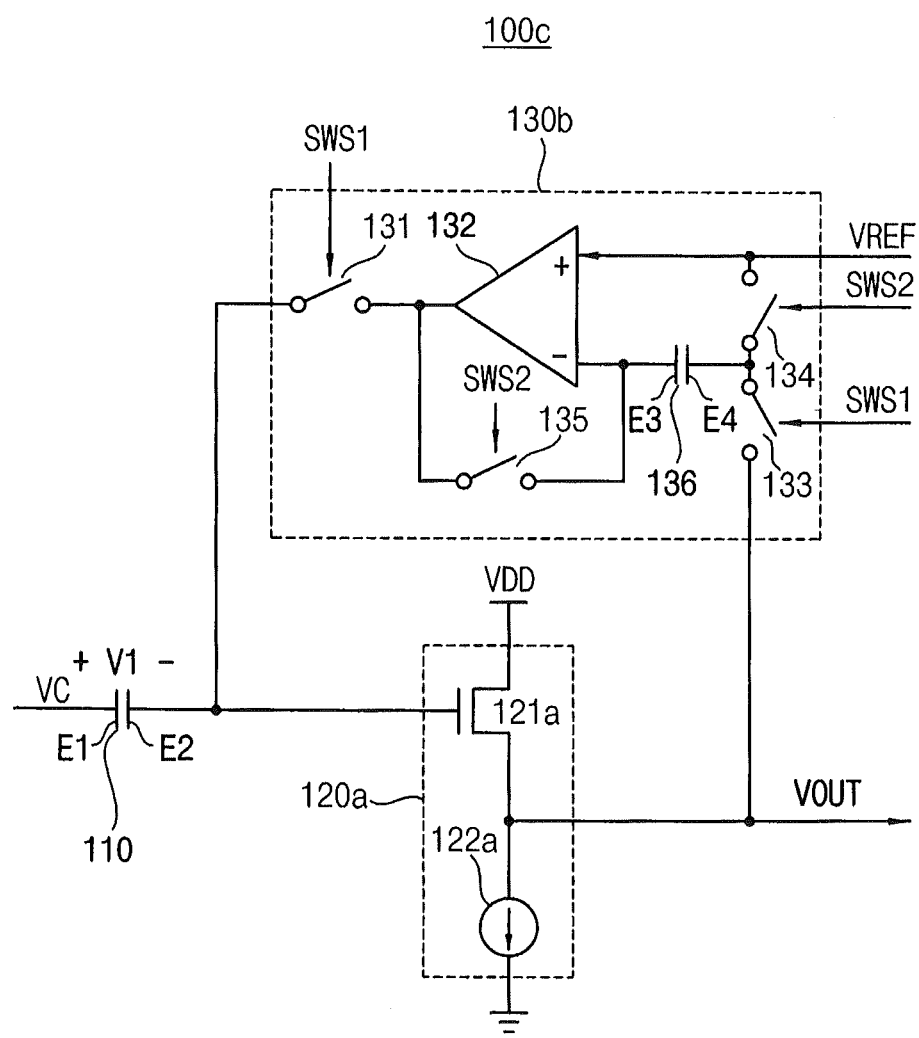
FIG. 7 is a circuit diagram illustrating an offset canceling circuit according to example embodiments.

FIG. 7 is a circuit diagram illustrating an offset canceling circuit according to example embodiments.

Referring to FIG. 7, an offset canceling circuit 100c includes a decoupling capacitor 110, a buffer 120a and a feedback circuit 130b. The offset canceling circuit 100c of FIG. 7 may have a configuration substantially similar to that of an offset canceling circuit 100a of FIG. 4 except a configuration of the feedback circuit 130b.

The feedback circuit 130b may include a first switch 131, an amplifier 132, a second switch 133, a third switch 134, a fourth switch 135 and an amplifier offset capacitor 136.

One end of the first switch 131 may be coupled to a second electrode E2 of the decoupling capacitor 110, and the other end of the first switch 131 may be coupled to an output terminal of the amplifier 132. One end of the second switch 133 may be coupled to an output terminal of the buffer 120a, and the other end of the second switch 133 may be coupled to a fourth electrode E4 of the amplifier offset capacitor 136. One end of the third switch 134 may be coupled to the fourth electrode E4 of the amplifier offset capacitor 136, and the other end of the third switch 134 may be coupled to a non-inverting input terminal of the amplifier 132. One end of the fourth switch 135 may be coupled to the output terminal of the amplifier 132, and the other end of the fourth switch 135 may be coupled to an inverting input terminal of the amplifier 132 and a third electrode E3 of the amplifier offset capacitor 136. The first switch 131 and the second switch 133 may be controlled by a first switching signal SWS1, and the third switch 134 and the fourth switch 135 may be controlled by a second switching signal SWS2. The first switch 131 may control a connection between the second electrode E2 and the amplifier 132 in response to the first switching signal SWS1, the second switch 133 may control a connection between the fourth electrode E4 and the output terminal of the buffer 120a in response to the first switching signal SWS1, the third switch 134 may control a connection between the fourth electrode E4 and the non-inverting input terminal of the amplifier 132 in response to the second switching signal SWS2, and the fourth switch 135 may control a connection between the output terminal of the amplifier 132 and the third electrode E3 in response to the second switching signal SWS2.

The amplifier offset capacitor 136 may have the third electrode E3 coupled to the inverting input terminal of the amplifier 132 and the fourth switch 135, and the fourth electrode E4 coupled to the second switch 133 and the third switch 134. While the second switching signal SWS2 has a logic high level, the third switch 134 and the fourth switch 135 may be turned on. If the third switch 134 and the fourth switch 135 are turned on, an output voltage of the amplifier 132 may be applied to the third electrode E3, and a reference voltage VREF may be applied to the fourth electrode E4. Accordingly, in a case where the output voltage of the amplifier 132 is not the same as the reference voltage VREF, and the output voltage of the amplifier 132 is a voltage where an offset of the amplifier 132 is added to the reference voltage VREF, the amplifier offset capacitor 136 may store charge corresponding to the offset of the amplifier 132.

While the second switching signal SWS2 has a logic low level, and the first switching signal SWS1 has a logic high level, the third switch 134 and the fourth switch 135 may be turned off, and the first switch 131 and the second switch 133 may be turned on. If the first switch 131 and the second switch 133 are turned on, a sum of an output voltage VOUT of the buffer 120a and the offset of the amplifier 132 may be applied to the inverting input terminal of the amplifier 132. Accordingly, even if the offset exists in the amplifier 132, the amplifier 132 may output the reference voltage VREF where the offset of the amplifier 132 is canceled. Thus, the amplifier 132 may provide charge to the decoupling capacitor 110 until the output voltage VOUT of the buffer 120a reaches the reference voltage VREF. Further, even if the offset exists in the amplifier 132, the decoupling capacitor 110 may store charge corresponding to a voltage difference (i.e. a first voltage V1) between a reset voltage and the reference voltage VREF. As described above, even if the offset exists in the amplifier 132, the offset of the amplifier 132 may be canceled by the amplifier offset capacitor 136.

Figure 8:
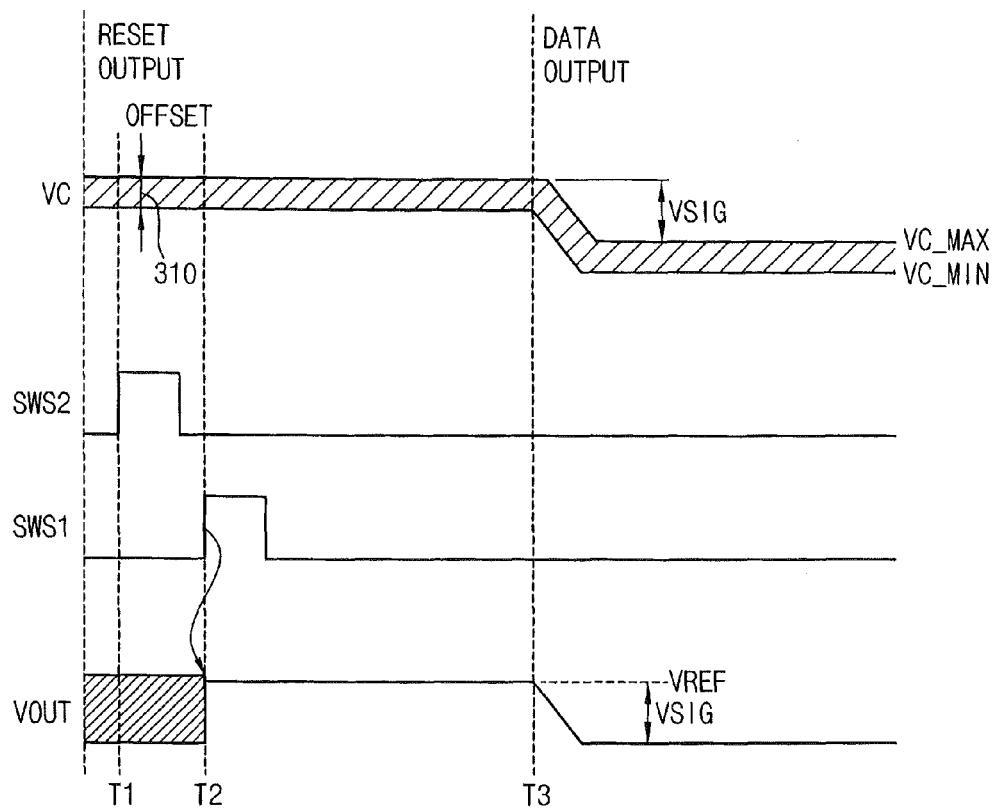
FIG. 8 is a timing diagram for describing an operation of an offset canceling circuit of FIG. 7.

FIG. 8 is a timing diagram for describing an operation of an offset canceling circuit of FIG. 7, and FIGS. 9A through 9C are circuit diagrams for describing an operation of an offset canceling circuit of FIG. 7.

Figure 9A:
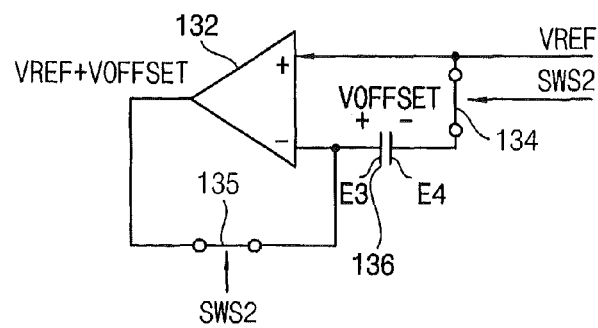
FIGS. 9A through 9C are circuit diagrams for describing an operation of an offset canceling circuit of FIG. 7.

Referring to FIGS. 8 and 9A, at a time point T1 where a second switching signal SWS2 has a logic high level, a third switch 134 and a fourth switch 135 may be turned on. An output voltage VREF+VOFFSET of an amplifier 132 may be applied to a third electrode E3 of an amplifier offset capacitor 136, and a reference voltage VREF may be applied to a fourth electrode E4 of the amplifier offset capacitor 136. Accordingly, the amplifier offset capacitor 136 may store charge corresponding to a voltage difference between the output voltage VREF+VOFFSET of the amplifier 132 and the reference voltage VREF. That is, the amplifier offset capacitor 136 may store charge corresponding to an offset voltage for the amplifier 132. Although FIG. 8 illustrates an example where the second switching signal SWS2 has a logic high level while a unit cell outputs a reset voltage, in some embodiments, the second switching signal SWS2 may have a logic high level before the reset voltage is output.

Figure 9B:
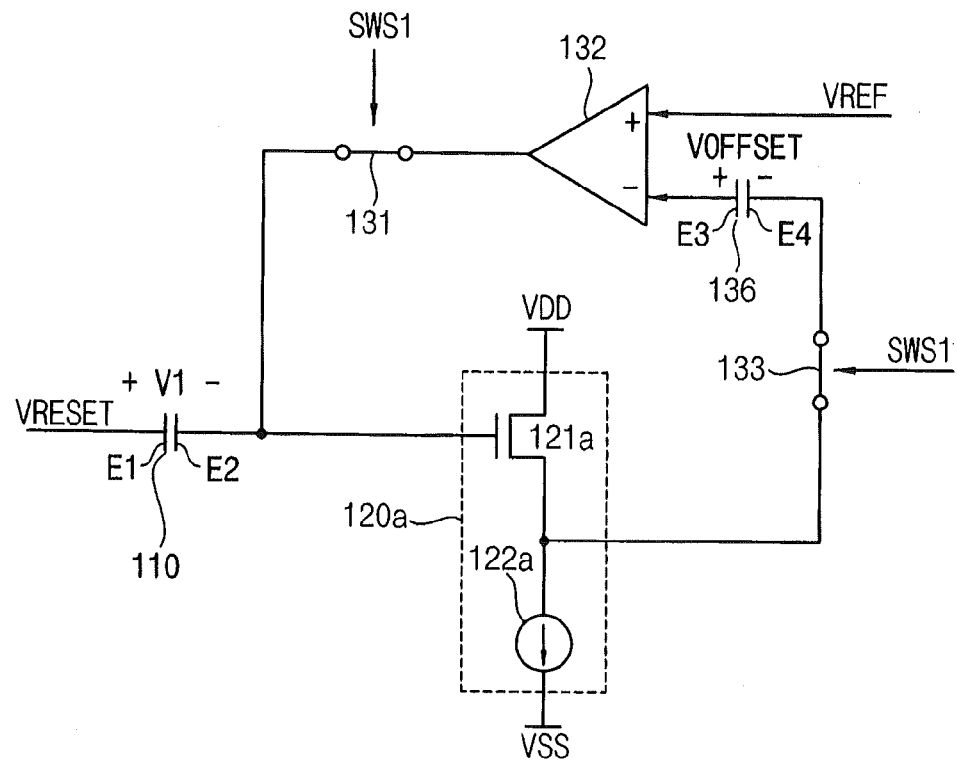

Referring to FIGS. 8 and 9B, at a time point T2 where a first switching signal SWS1 has a logic high level, the unit cell may output the reset voltage VRESET, and the first switch 131 and the second switch 133 may be turned on. Because the amplifier offset capacitor 136 stores the charge corresponding to the offset voltage VOFFSET, a sum of an output voltage VOUT of a buffer 120a and the offset voltage VOFFSET may be applied to an inverting input terminal of the amplifier 132. Accordingly, the amplifier 132 may provide charge to a decoupling capacitor 110 until the output voltage VOUT of the buffer 120a reaches the reference voltage VREF, and the decoupling capacitor 110 may store the charge corresponding to a voltage difference (i.e., a first voltage V1) between the reset voltage VRESET and the reference voltage VREF.

Figure 9C:
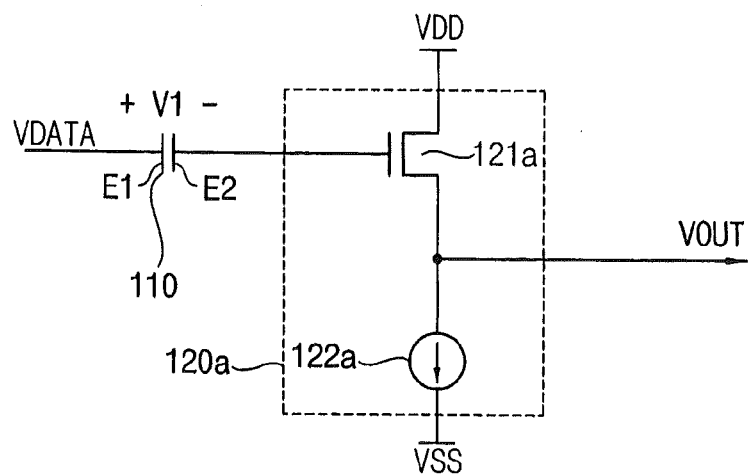

Referring to FIGS. 8 and 9C, at a time point T3 where the unit cell outputs a data voltage VDATA, the data voltage VDATA may be applied to a first electrode E1 of the decoupling capacitor 110. Because the decoupling capacitor 110 stores the charges corresponding to the voltage difference between the reset voltage VRESET and the reference voltage VREF, a second electrode E2 of the decoupling capacitor 110 may have a second voltage corresponding to a sum of a sensing voltage VSIG and the reference voltage VREF. The buffer 120a may output the sum of the sensing voltage VSIG and the reference voltage VREF as the output voltage VOUT.

As described above, the offset canceling circuit 100c according to example embodiments may cancel an offset of the unit cell, and may cancel an offset of the amplifier 132.

Figure 10:
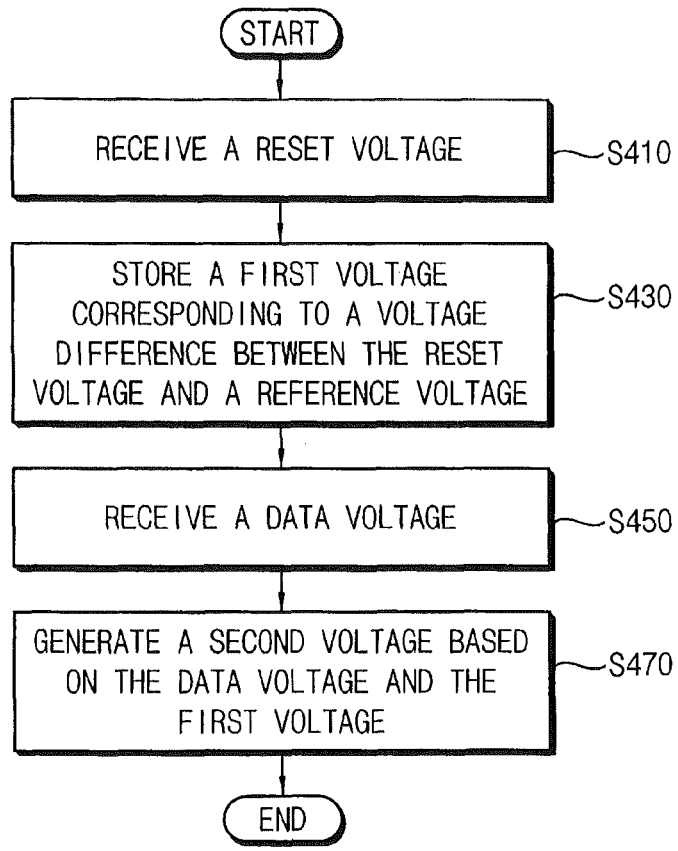
FIG. 10 is a flow chart illustrating a method of cancelling an offset according to example embodiments.

FIG. 10 is a flow chart illustrating a method of cancelling an offset according to example embodiments.

Referring to FIGS. 1 and 10, an offset canceling circuit 100 may receive a reset voltage from a unit cell 200 (S410). A feedback circuit 130 may provide charge to a decoupling capacitor 110 until an output voltage VOUT reaches a reference voltage VREF. Accordingly, the decoupling capacitor 110 may store charge corresponding to a first voltage V1, and the first voltage V1 may correspond to a voltage difference between the reset voltage and the reference voltage VREF (S430).

The offset canceling circuit 100 may receive a data voltage from the unit cell 200 (S450). If the data voltage is applied to a first electrode E1 of the decoupling capacitor 110, a second electrode E2 of the decoupling capacitor 110 may have a second voltage, and the second voltage may correspond to a voltage difference between the data voltage and the first voltage V1. The buffer 120 may output the second voltage as the output voltage VOUT (S470). Accordingly, the offset canceling circuit 100 may output the output voltage VOUT where an offset of the unit cell 200 is canceled.

Figure 11:
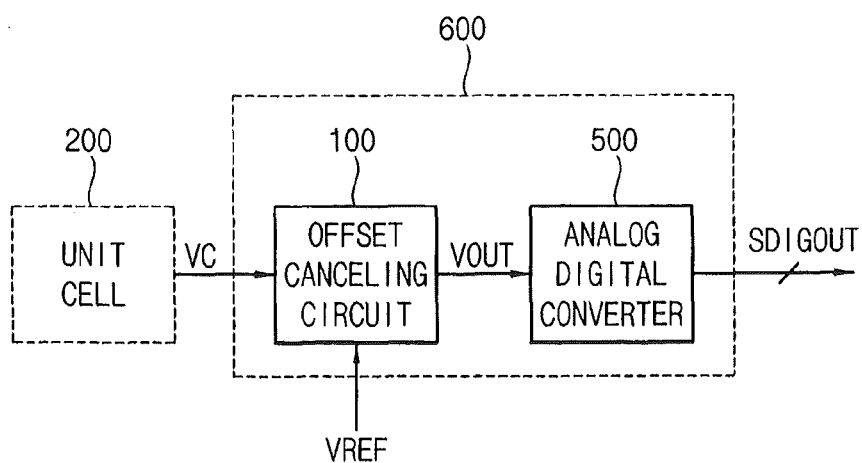
FIG. 11 is a block diagram illustrating a sampling circuit according to example embodiments.

FIG. 11 is a block diagram illustrating a sampling circuit according to example embodiments.

Referring to FIG. 11, a sampling circuit 600 includes an offset canceling circuit 100 and an analog-to-digital converter (ADC) 500.

The offset canceling circuit 100 may sequentially receive a reset voltage and a data voltage as a cell voltage VC from a unit cell 200. For example, the unit cell 200 may be an element of a sensor that outputs an electrical signal by sensing a physical quantity, such as intensity of light, temperature, mass, time, etc.

The offset canceling circuit 100 may receive a reference voltage VREF from a reference voltage generator (not shown). The reference voltage generator that generates the reference voltage VREF may be located inside or outside the sampling circuit 600. In some embodiments, the reference voltage generator may be a ramp voltage generator.

When the unit cell 200 outputs the reset voltage as the cell voltage VC, the offset canceling circuit 100 may store a first voltage corresponding to a voltage difference between the reset voltage and the reference voltage VREF. When the unit cell 200 outputs the data voltage as the cell voltage VC, the offset canceling circuit 100 may generate a second voltage as an output voltage VOUT based on the data voltage and the first voltage. Accordingly, the offset canceling circuit 100 may output a sum of a sensing voltage and the reference voltage VREF.

For example, when the unit cell 200 outputs the reset voltage, a decoupling capacitor included in the offset canceling circuit 100 may store charge corresponding to the first voltage. Subsequently, when the unit cell 200 outputs the data voltage, the offset canceling circuit 100 may output the second voltage corresponding to a voltage difference between the data voltage and the first voltage. That is, the offset canceling circuit 100 may output as the output voltage VOUT the sum of a sensing voltage and the reference voltage VREF.

The analog-to-digital converter 500 may receive the output voltage VOUT from the offset canceling circuit 100, and may convert the output voltage VOUT into a digital output signal SDIGOUT. The analog-to-digital converter 500 may be implemented in various manners. For example, the analog-to-digital converter 500 may include a single slop ADC, a delta-sigma ADC, a successive approximation ADC, a cyclic ADC, a flash ADC, a pipelined ADC, a folding ADC, etc.

In some embodiments, the offset canceling circuit 100 (e.g., a feedback circuit of the offset canceling circuit 100) and the analog-to-digital converter 500 may share an amplifier.

In some embodiments, a plurality of offset canceling circuits 100 may be located at a plurality of columns, respectively, and a plurality of analog-to-digital converters 500 may be located at a plurality of columns, respectively.

In other embodiments, a plurality of offset canceling circuits 100 may be located at a plurality of columns, respectively, and only one analog-to-digital converter 500 may be disposed for a plurality of columns. In this case, the one analog-to-digital converter 500 may sequentially convert a plurality of output voltages VOUT output from the plurality of columns into digital output signals DIGOUT.

The sampling circuit 600 may perform correlated double sampling (CDS). In some embodiments, the offset canceling circuit 100 may output as the output voltage VOUT the second voltage, or a voltage where the sensing voltage is added to the reference voltage VREF, and the analog-to-digital converter 500 may perform a signal conversion operation that converts the second voltage into the digital output signal SDIGOUT using the reference voltage VREF as a reference point. Thus, the sampling circuit 600 may generate the digital output signal SDIGOUT corresponding to an effective signal component where an offset is canceled. As described above, the sampling circuit 600 according to some example embodiments may perform analog CDS that extracts the effective signal component in an analog manner. In some embodiments, the analog-to-digital convert 500 may receive the reference voltage VREF as the output voltage VOUT from the offset canceling circuit 100, or may directly receive the reference signal VREF from the reference voltage generator.

In other embodiments, when the unit cell 200 outputs the reset voltage, the offset canceling circuit 100 may output the reference voltage as the output voltage VOUT, and the analog-to-digital converter 500 may perform a reference conversion operation that converts the reference voltage VREF into a first digital output signal. When the unit cell 200 outputs the data voltage, the offset canceling circuit 100 may output as the output voltage VOUT the second voltage, or a voltage where the sensing voltage is added to the reference voltage VREF, and the analog-to-digital converter 500 may perform a signal conversion operation that converts the second voltage into a second digital output signal. Accordingly, a digital signal corresponding to an effective signal component where an offset is canceled may be generated based on a difference between the first digital output signal and the second digital output signal. As described above, the sampling circuit 600 corresponding to other example embodiments may perform dual CDS that not only extracts the effective signal component in an analog manner, but also converts a reference component and a signal component into digital signals, respectively. Because the sampling circuit 600 performs the dual CDS, an offset that may occur in the analog-to-digital converter 500 may be canceled.

Figure 12:
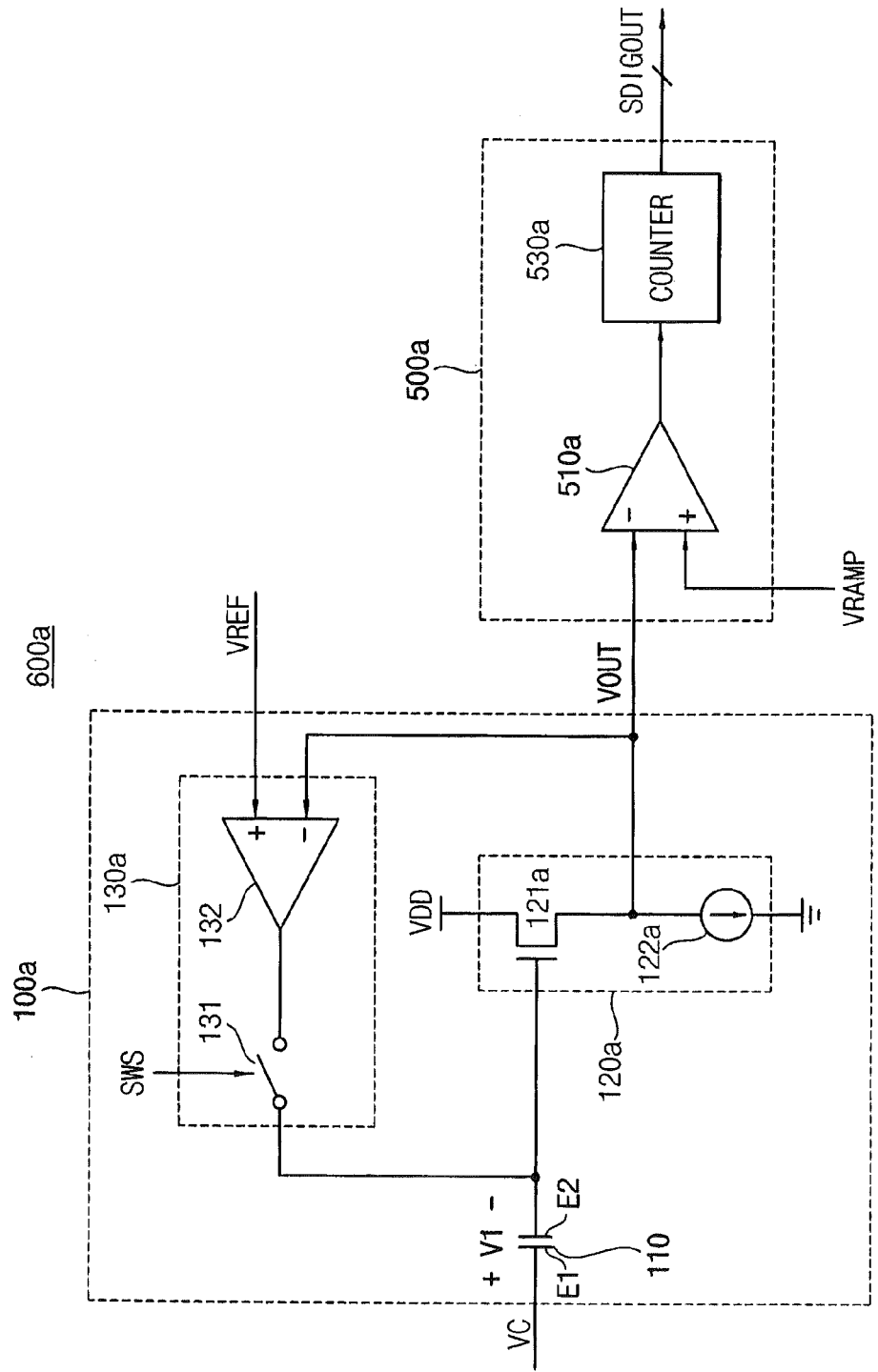
FIG. 12 is a circuit diagram illustrating a sampling circuit according to example embodiments.

FIG. 12 is a circuit diagram illustrating a sampling circuit according to example embodiments.

Referring to FIG. 12, a sampling circuit 600a includes an offset canceling circuit 100a and an analog-to-digital converter 500a. Although FIG. 12 illustrates the sampling circuit 600a including the offset canceling circuit 100a of FIG. 4, the sampling circuit 600a may include an offset canceling circuit 100b of FIG. 6 or an offset canceling circuit 100c of FIG. 7.

The analog-to-digital converter 500a may include a comparator 510a and a counter 530a. The comparator 510a may receive an output voltage VOUT from the offset canceling circuit 100a, and may receive a ramp voltage VRAMP from a ramp voltage generator (not shown). In some embodiments, the ramp voltage generator may generate a reference voltage VREF as well as the ramp voltage VRAMP. The ramp voltage generator may be located inside or outside the analog-to-digital converter 500a. In some embodiments, a plurality of analog-to-digital converters 500a may be located at a plurality of columns, respectively, and the plurality of analog-to-digital converters 500a may receive the same ramp voltage VRAMP form a single ramp voltage generator.

The comparator 510a may compare the output voltage VOUT and the ramp voltage VRAMP, and may provide a result of the comparison to the counter 530a. The counter 530a may generate a digital output signal SDIGOUT by counting the number of cycles or the time until the ramp voltage VRAMP reaches the output voltage VOUT.

In some embodiments, the analog-to-digital converter 500a may perform a reference conversion operation that converts the reference voltage VREF into a first digital output signal SDIGOUT, and may further perform a signal conversion operation that converts a voltage where a sensing voltage is added to the reference voltage VREF into a second digital output signal SDIGOUT. In other embodiments, the analog-to-digital converter 500a may perform only the signal conversion operation that converts the voltage where the sensing voltage is added to the reference voltage VREF into a digital output signal SDIGOUT using the reference voltage VREF as a reference point.

In some embodiments, a plurality of offset canceling circuits 100a may be located at a plurality of columns of a cell array, respectively, and a single analog-to-digital converter 500a including one comparator 510a and one counter 530a may sequentially convert a plurality of output voltages VOUT output from the plurality of columns into the digital output signal SDIGOUT. In other embodiments, a plurality of analog-to-digital converters 500a may be located at the plurality of columns, respectively. In still other embodiments, a plurality of comparators 510a may be located at the plurality of columns, respectively, and one counter 530a may be shared. In this case, the analog-to-digital converter 500a may include a plurality of latches (not shown) located at the plurality of columns, respectively, and the plurality of latches may store a counting signal output from the shared counter 530a. In some embodiments, the analog-to-digital converter 500a may include signal latches that store the counting signal corresponding to the sensing voltage, or may include reference latches that store the counting signal corresponding to the reference voltage VREF along with the signal latches.

Figure 13:
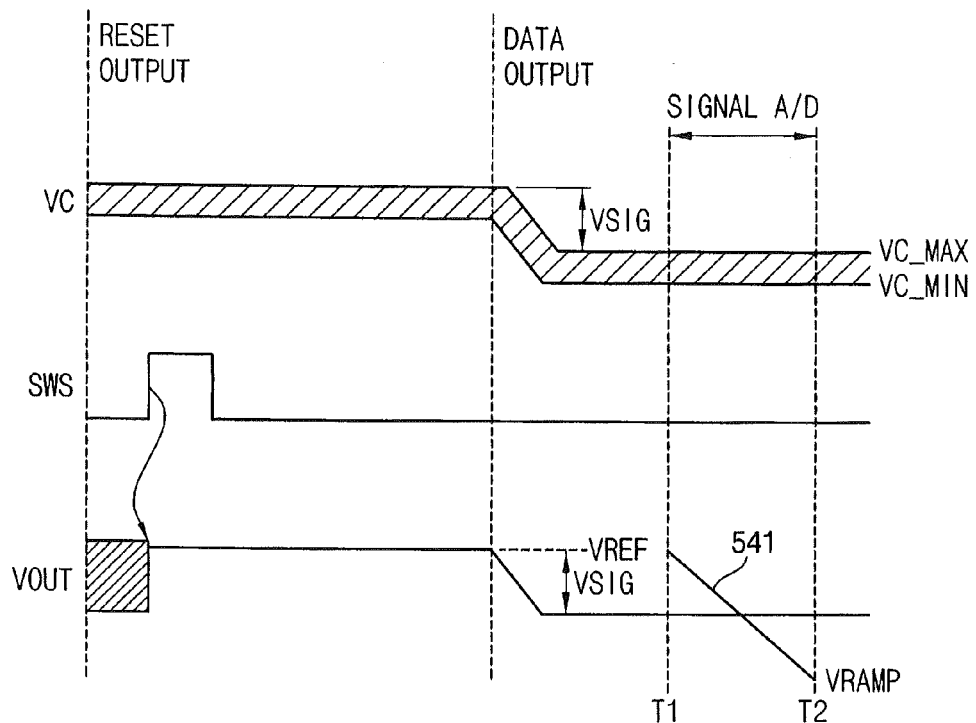
FIG. 13 is a timing diagram for describing an operation of a sampling circuit of FIG. 12.

FIG. 13 is a timing diagram for describing an operation of a sampling circuit of FIG. 12.

Referring to FIGS. 12 and 13, while a reset voltage is output as a cell voltage VC, a switching signal SWS may have a logic high level during a predetermined period of time. If the switching signal SWS has a logic high level, an output voltage VOUT of an offset canceling circuit 100a may have a voltage level substantially the same as that of a reference voltage VREF.

If a data voltage is output as the cell voltage VC, the offset canceling circuit 100a may output a second voltage, which is a voltage where a sensing voltage VSIG is added to the reference voltage VREF, as the output voltage VOUT. An analog-to-digital converter 500a may receive the second voltage as the output voltage VOUT from the offset canceling circuit 100a, and may receive a ramp voltage 541 from a ramp voltage generator (not shown). The analog-to-digital converter 500a may convert the second voltage into a digital output signal SDIGOUT using the reference voltage as a reference point during a predetermined period of time T1 through T2. Accordingly, a sampling circuit 600a may generate the digital output signal SDIGOUT corresponding to an effective signal component where an offset is canceled. As described above, the sampling circuit 600a may perform analog CDS that extracts the effective signal component in an analog manner.

Figure 14:
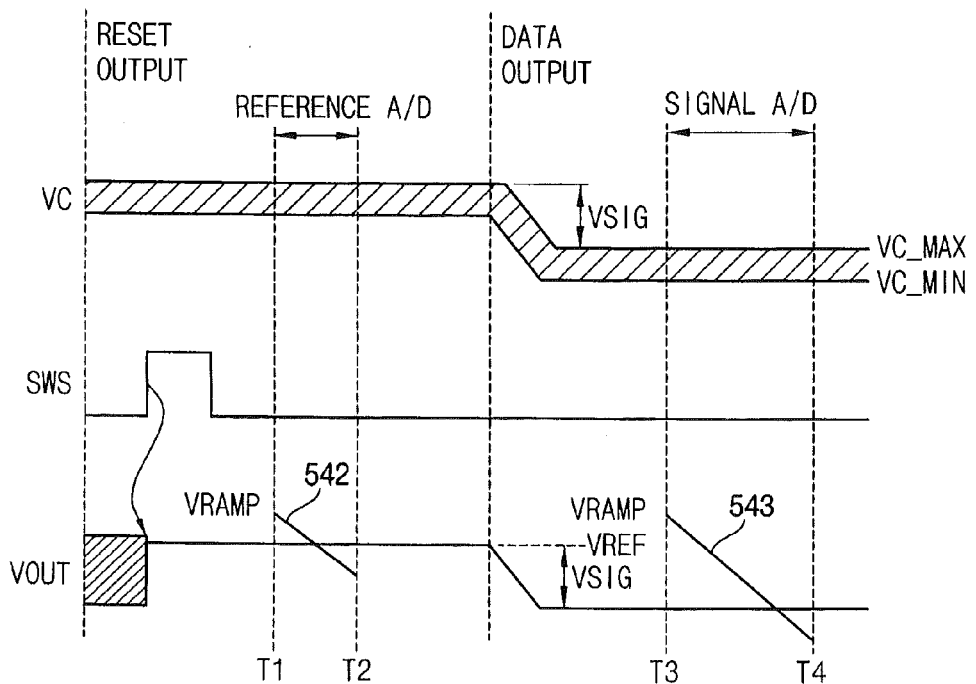
FIG. 14 is a timing diagram for describing an operation of a sampling circuit of FIG. 12.

FIG. 14 is a timing diagram for describing an operation of a sampling circuit of FIG. 12.

Referring to FIGS. 12 and 14, while a reset voltage is output as a cell voltage VC, a switching signal SWS may have a logic high level during a predetermined period of time. If the switching signal SWS has a logic high level, an output voltage VOUT of an offset canceling circuit 100a may have a voltage level substantially the same as that of a reference voltage VREF. An analog-to-digital converter 500a may receive the reference voltage VREF as the output voltage VOUT from the offset canceling circuit 100a, and may receive a first ramp voltage 542 from a ramp voltage generator (not shown). The analog-to-digital converter 500a may convert the reference voltage VREF into a first digital output signal during a predetermined period of time T1 through T2.

If a data voltage is output as the cell voltage VC, the offset canceling circuit 100a may output a second voltage, which is a voltage where a sensing voltage VSIG is added to the reference voltage VREF, as the output voltage VOUT. The analog-to-digital converter 500a may receive the second voltage as the output voltage VOUT from the offset canceling circuit 100a, and may receive a second ramp voltage 543 from the ramp voltage generator. The analog-to-digital converter 500a may convert the second voltage into a second digital output signal during a predetermined period of time T3 through T4. A sensor device including a sampling circuit 600a may extract a digital value corresponding to an effective signal component based on the first digital output signal and the second digital output signal.

As described above, by performing a reference conversion operation REFERENCE A/D and a signal conversion operation SIGNAL A/D, the sampling circuit 600a may perform dual CDS that not only extracts the effective signal component in an analog manner, but also respectively converts a reference component and a signal component into digital signals. Because an input of the reference conversion operation REFERENCE may be substantially fixed to the reference voltage VREF, the reference conversion operation REFERENCE may be more rapidly performed than the signal conversion operation SIGNAL A/D.

Figure 15:
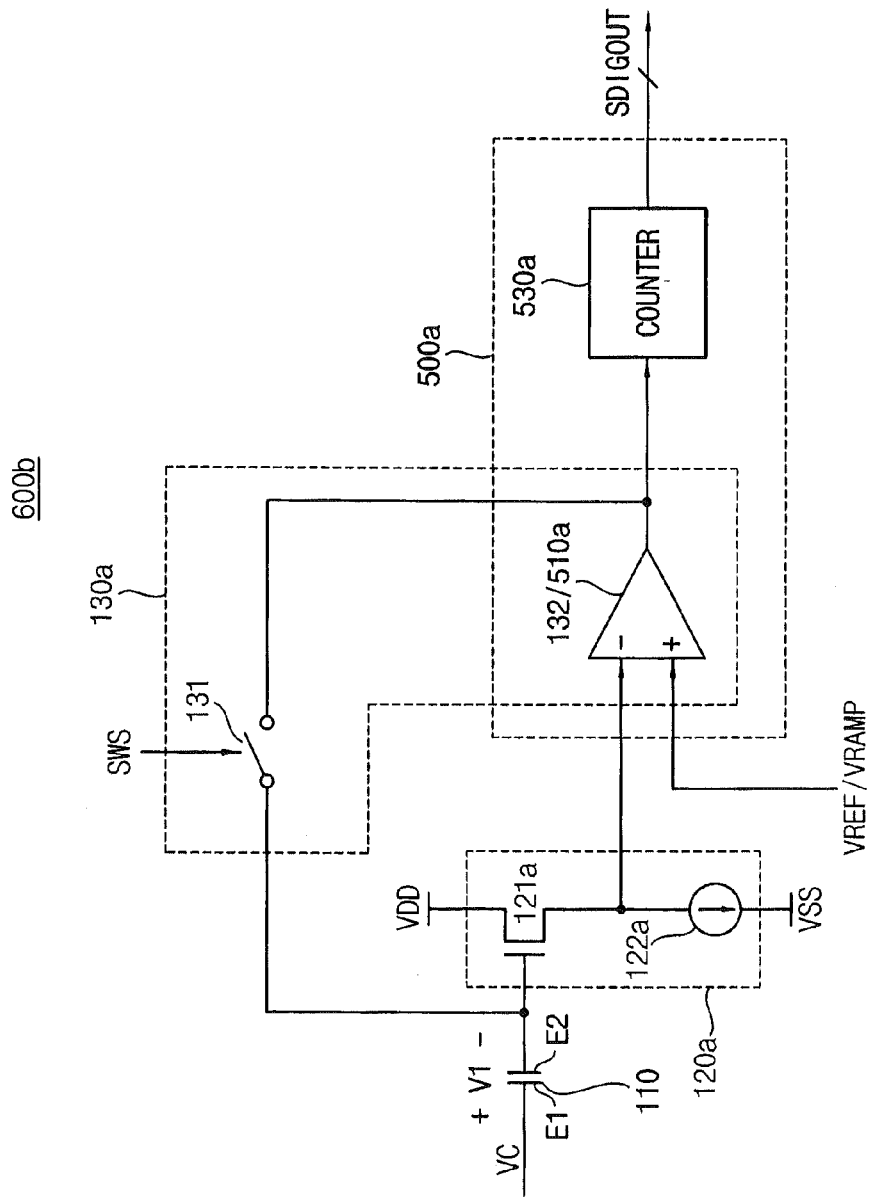
FIG. 15 is a circuit diagram illustrating a sampling circuit according to example embodiments.

FIG. 15 is a circuit diagram illustrating a sampling circuit according to example embodiments.

A sampling circuit 600b of FIG. 15 may have a configuration substantially similar to that of a sampling circuit 600a of FIG. 12 except that a shared amplifier 132/510a is used as an amplifier 132 of a feedback circuit 130a and a comparator 510a of an analog-to-digital converter 500a.

Referring to FIG. 15, the shared amplifier 132/510a may operate not only as the amplifier 132 of the feedback circuit 130a but also as the comparator 510a of the analog-to-digital converter 500a. While a switching signal SWS has a logic high level, the shared amplifier 132/510a may receive a reference voltage VREF from a reference voltage generator (not shown) or a ramp voltage generator (not shown), and the shared amplifier 132/510a may operate as the amplifier 132 of the feedback circuit 130a. While the analog-to-digital converter 500a performs a reference conversion operation and/or a signal conversion operation, the shared amplifier 132/510a may receive a ramp voltage VRAM from the reference voltage generator or the ramp voltage generator, and the shared amplifier 132/510a may operate as the comparator 510a of the analog-to-digital converter 500a.

Although FIG. 15 illustrates an example where the sampling circuit 600b includes a single slope ADC as the analog-to-digital converter 500a, and the feedback circuit 130a and the single slop ADC share the amplifier 132/510a, in some embodiments, the sampling circuit 600b may include various types of ADCs, such as a delta-sigma ADC, a successive approximation ADC, a cyclic ADC, a flash ADC, a pipelined ADC, a folding ADC, etc., and the feedback circuit 130a may share the amplifier 132/510a with various types of ADCs.

Further, although FIG. 15 illustrates an example where the analog-to-digital converter 500a shares the amplifier 132/510a with the feedback circuit 130a, in some embodiments, the sampling circuit 600b may include an amplifier 121b as a buffer 120b as illustrated in FIG. 6, and the analog-to-digital converter 500a may share the amplifier with the buffer 120a.

Figure 16:
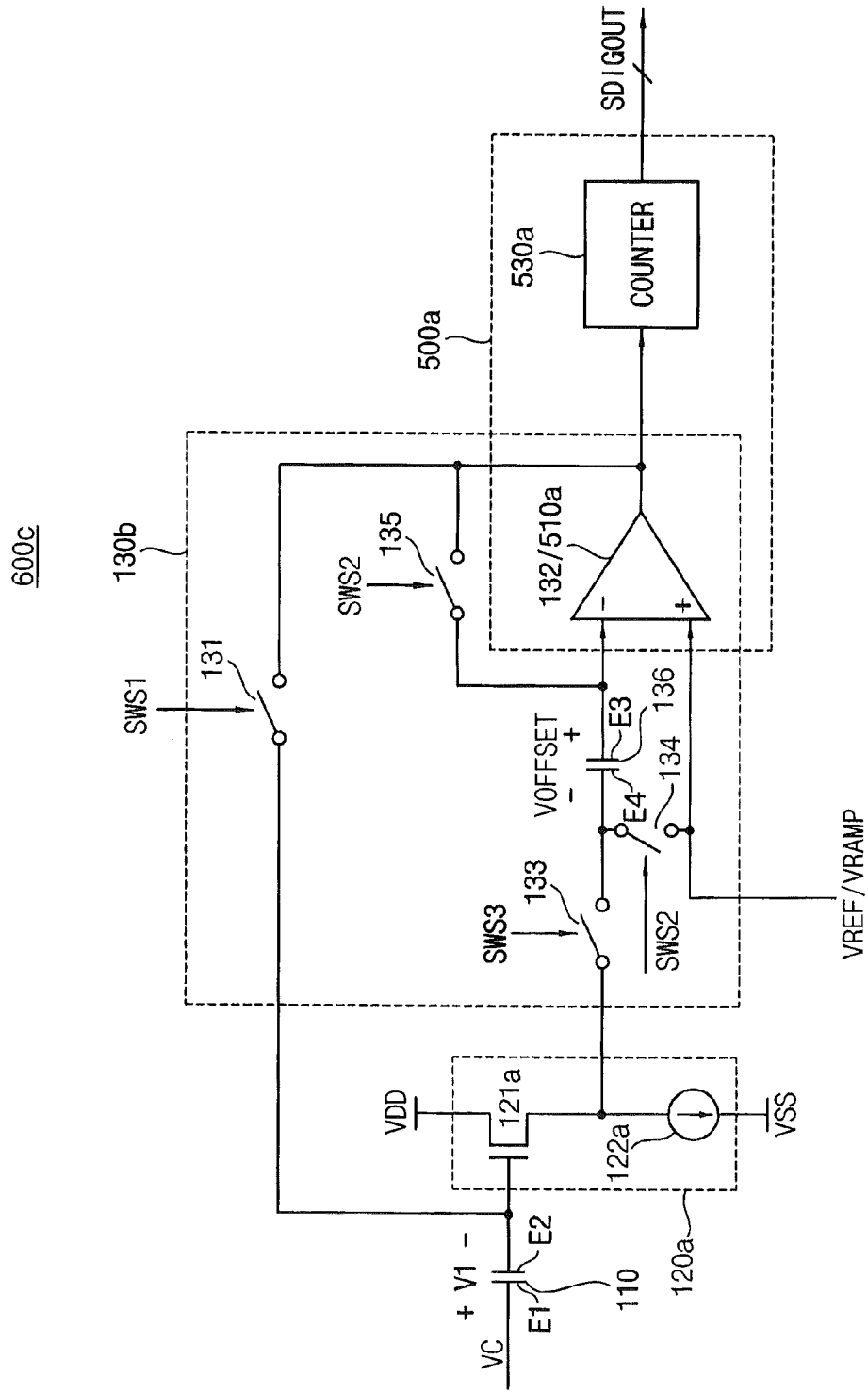
FIG. 16 is a circuit diagram illustrating a sampling circuit according to example embodiments.

FIG. 16 is a circuit diagram illustrating a sampling circuit according to example embodiments.

A sampling circuit 600c of FIG. 16 may have a configuration substantially similar to that of sampling circuit 600b of FIG. 15 except that a feedback circuit 130b illustrated in FIG. 7 is used.

Referring to FIG. 16, a shared amplifier 132/510a may operate not only as an amplifier 132 of the feedback circuit 130b but also as a comparator 510a of the analog-to-digital converter 500a. While a first switching signal SWS1 or a second switching signal SWS2 has a logic high level, the shared amplifier 132/510a may receive a reference voltage VREF from a reference voltage generator (not shown) or a ramp voltage generator (not shown), and the shared amplifier 132/510a may operate as the amplifier 132 of the feedback circuit 130b. While the analog-to-digital converter 500a performs a reference conversion operation and/or a signal conversion operation, the shared amplifier 132/510a may receive a ramp voltage VRAM from the reference voltage generator or the ramp voltage generator, and the shared amplifier 132/510a may operate as the comparator 510a of the analog-to-digital converter 500a.

Hereinafter, an operation of the sampling circuit 600c will be described below.

While the second switching signal SWS2 has a logic high level, the shared amplifier 132/510a may receive the reference voltage VREF from the reference voltage generator or the ramp voltage generator, and an amplifier offset capacitor 136 may store charges corresponding to an offset VOFFSET of the shared amplifier 132/510a. Such an operation may be performed before a reset voltage is output or while the reset voltage is output.

While the reset voltage is output as a cell voltage VC, the first switching signal SWS1 and a third switching signal SWS3 may have a logic high level during a predetermined period of time. While the first switching signal SWS1 and the third switching signal SWS3 have a logic high level, the shared amplifier 132/510a may receive the reference voltage VREF from the reference voltage generator of the ramp voltage generator, and the decoupling capacitor 110 may store charge corresponding to a first voltage V1 (i.e., a voltage difference between the reset voltage and the reference voltage VREF). In some embodiments, after the decoupling capacitor 110 stores the charge corresponding to the first voltage V1, the first switching signal SWS1 may have a logic low level, the third switching signal SWS3 may have a logic high level, and the shared amplifier 132/510a may receive the ramp voltage VRAMP from the reference voltage generator or the ramp voltage generator. Thus, the analog-to-digital converter 500a may perform a reference conversion operation.

While a data voltage is output as the cell voltage VC, the third switching signal SWS3 has a logic high level, and the shared amplifier 132/510a may receive the ramp voltage VRAMP form the reference voltage generator or the ramp voltage generator. The shared amplifier 132/510a may receive a second voltage (i.e., a voltage where a sensing voltage is added to the reference voltage VREF) at an inverting input terminal. Accordingly, the analog-to-digital converter 500a may perform a signal conversion operation.

As described above, the sampling circuit 600c according to example embodiments may cancel an offset of a unit cell and an offset of the amplifier 132/510a using the decoupling capacitor 110 and the amplifier offset capacitor 136. Further, the sampling circuit 600c according to example embodiments may generate an exact digital output signal SDIGOUT corresponding to an effective signal component by performing analog CDS or dual CDS. In addition, the sampling circuit 600c according to example embodiments may share the amplifier 132/510a, thereby reducing the sampling circuit 600c in size.

Figure 17:
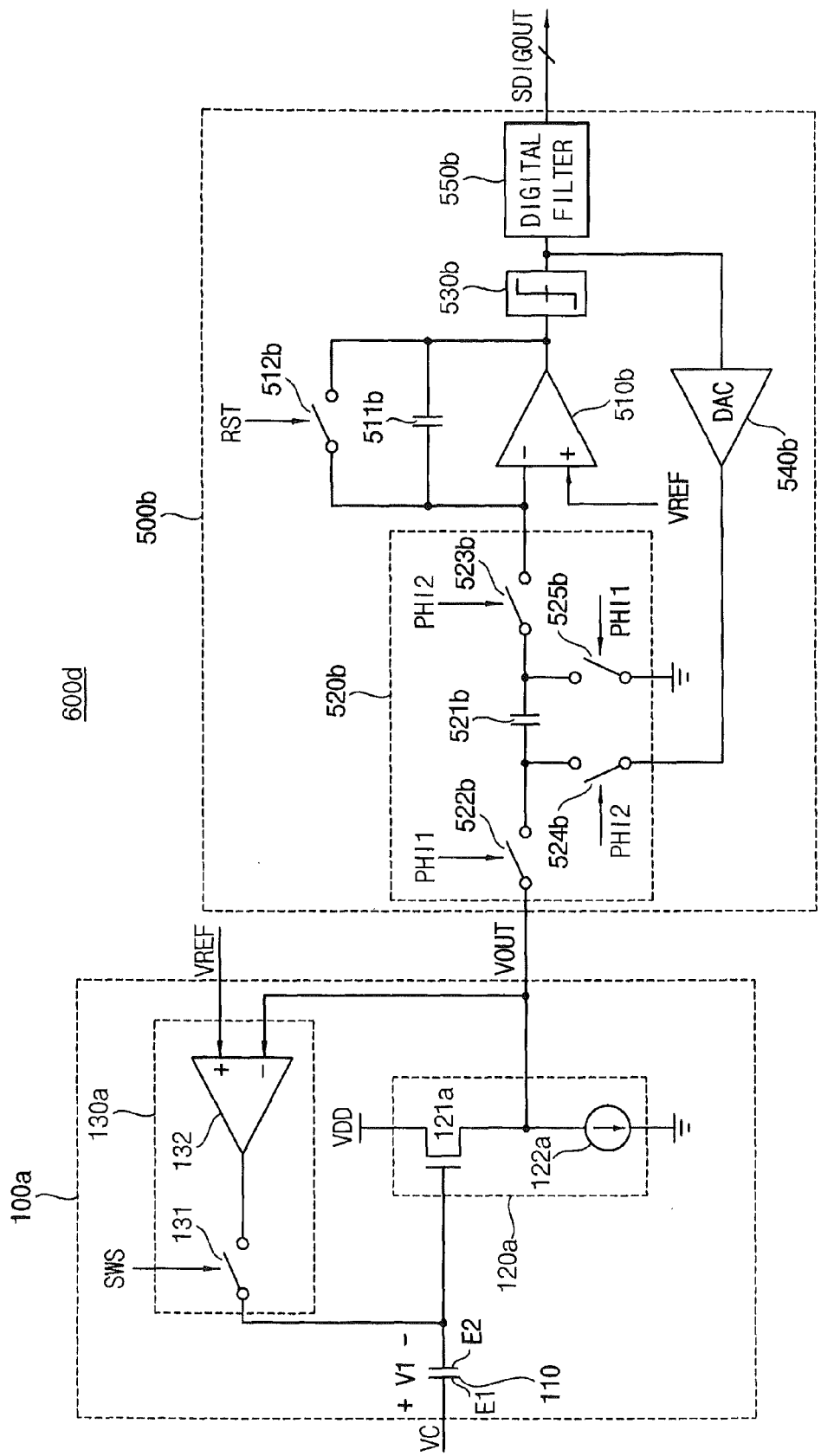
FIG. 17 is a circuit diagram illustrating a sampling circuit according to example embodiments.

FIG. 17 is a circuit diagram illustrating a sampling circuit according to example embodiments.

Referring to FIG. 17, a sampling circuit 600d includes an offset canceling circuit 100a and an analog-to-digital converter 500b. Although FIG. 17 illustrates an example where the sampling circuit 600d includes the offset canceling circuit 100a of FIG. 4, the sampling circuit 600d may include an offset canceling circuit 100b of FIG. 6 or an offset canceling circuit 100c of FIG. 7.

The analog-to-digital converter 500b may include an integrator 510b, 511b, 512b and 520b, a quantizer 530b, a digital-to-analog converter 540b and a digital filter 550b. The analog-to-digital converter 500b may convert an output voltage VOUT of the offset canceling circuit 100a into a digital output signal SDIGOUT. When performing the analog-to-digital conversion, the analog-to-digital converter 500b may perform oversampling and/or noise shaping. Accordingly, a quantization noise may be moved into a high frequency band, and noise may be reduced.

The integrator 510b, 511b, 512b and 520b may integrate a difference between the output voltage VOUT and a feedback signal output form the digital-to-analog converter 540b. The integrator 510b, 511b, 512b and 520b may include an amplifier 510b, a first capacitor 511b, a reset switch 512b and a switched capacitor 520b. The amplifier 510b may have an inverting input terminal to which a difference between the output voltage VOUT and an output signal of the digital-to-analog converter 540b is applied via the switched capacitor 520b, and a non-inverting input terminal to which a reference voltage VREF is applied. The first capacitor 511b and the reset switch 512b may be coupled in parallel between the inverting input terminal of the amplifier 510b and an output terminal of the amplifier 510b. The first capacitor 511b may store charge based on the different between output voltage VOUT and the output signal of the digital-to-analog converter 540b, and the reset switch 512b may discharge the first capacitor 511b in response to a reset signal RST.

The switched capacitor 520b may include a second capacitor 521b, a first switch 522b, a second switch 523b, a third switch 524b and a fourth switch 525b. The first switch 522b may control a connection between the offset canceling circuit 100a and the second capacitor 521b in response to a first phase switching signal PHIL, the second switch 523b may control a connection between the second capacitor 521b and the amplifier 510b in response to a second phase switching signal PHI2, the third switch 524b may control a connection between the digital-to-analog converter 540b and the second capacitor 521b in response to the second phase switching signal PHI2, and the fourth switch 525b may control a connection between the second capacitor 521b and a second power supply voltage (e.g., a ground voltage) in response to the first phase switching signal PHI1. While the analog-to-digital converter 510b performs a reference conversion operation or a signal conversion operation, the first phase switching signal PHI1 and the second phase switching signal PHI2 may have opposite phases, and may periodically transition from a logic low level to a logic high level or from a logic high level to a logic low level. Accordingly, the turn-on of the first switch 522b and the fourth switch 525b and the turn-off of the second switch 523b and the third switch 524b, or the turn-off of the first switch 522b and the fourth switch 525b and the turn-on of the second switch 523b and the third switch 524b may be periodically repeated. The switched capacitor 520b performing such an operation may serve as a resistor. In some embodiments, the integrator 510b, 511b, 512b and 520b may include a resistor instead of the switched capacitor 520b.

The quantizer 530b may output a digital signal by quantizing an output signal of the integrator 510b, 511b, 512b and 520b. In some embodiments, the digital signal output from the quantizer 530b may have a single bit or multiple bits. The digital-to-analog converter 540b may generate the feedback signal by converting the digital signal into an analog signal, and may provide the feedback signal to the integrator 510b, 511b, 512b and 520b. The digital filter 550b may generate a digital output signal SDIGOUT based on the digital signal output from the quantizer 530b. For example, the digital filter 550b may generate the digital output signal SDIGOUT by calculating a mean value of the digital signal that is a serial bit stream. The digital filter 550b may remove an out-of-band quantization noise.

In some embodiments, the analog-to-digital converter 500b may perform a reference conversion operation that converts the reference voltage VREF into a first digital output signal SDIGOUT, and may perform a signal conversion operation that converts a second voltage where a sensing voltage is added to the reference voltage VREF into a second digital output signal SDIGOUT. In other embodiments, the analog-to-digital converter 500b may perform only a signal conversion operation that converts the second voltage into the digital output signal SDIGOUT using the reference voltage VREF as a reference point.

Figure 18:
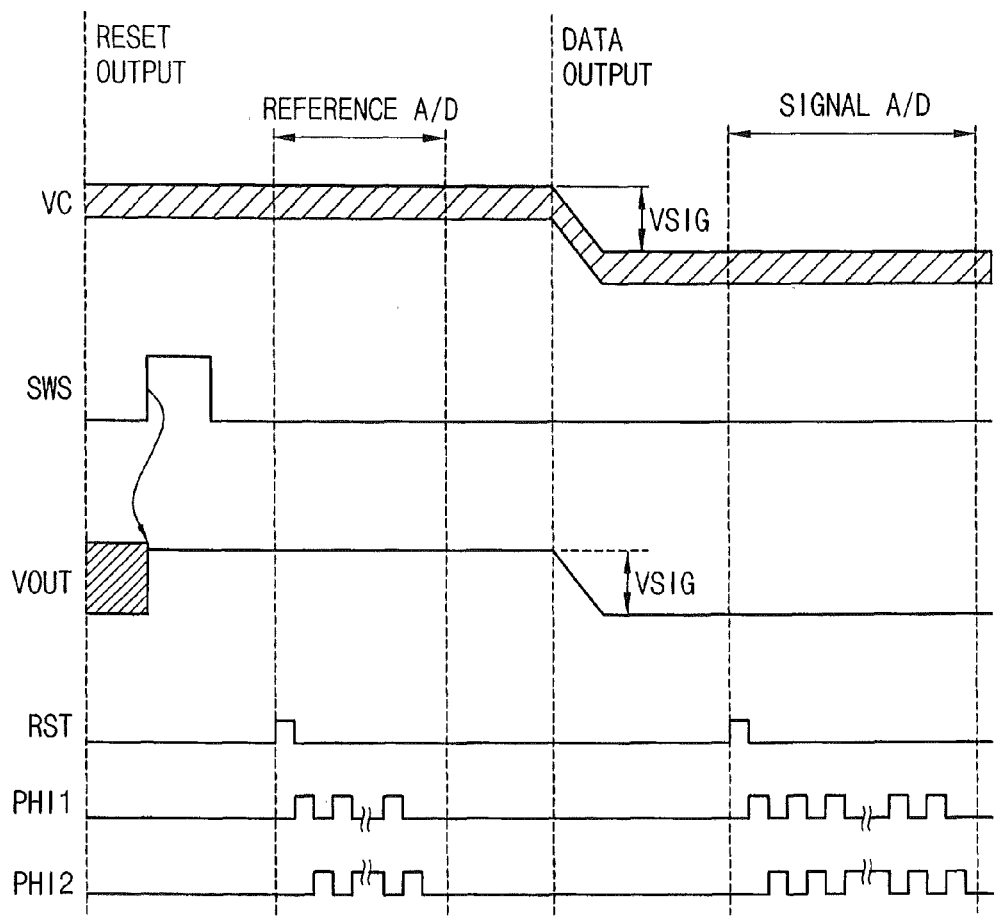
FIG. 18 is a timing diagram for describing an operation of a sampling circuit of FIG. 17.

FIG. 18 is a timing diagram for describing an operation of a sampling circuit of FIG. 17.

Referring to FIGS. 17 and 18, while a reset voltage is output as a cell voltage VC, a switching signal SWS may have a logic high level during a predetermined period of time. If the switching signal SWS has a logic high level, an output voltage VOUT of an offset canceling circuit 100a may have a voltage level substantially the same as that of a reference voltage VREF. In some embodiments, an analog-to-digital converter 500b may receive a reference voltage VREF as the output voltage VOUT of the offset canceling circuit 100a, and may perform a reference conversion operation REFERENCE A/D that converts the reference voltage VREF into a first digital output signal. A reset signal RST may have a logic high level during a predetermined period of time, and a first capacitor 511b may be discharged. During the reference conversion operation REFERENCE A/D, a first phase switching signal PHI1 and a second switching signal PHI2 may have opposite phases, and may periodically transition from a logic low level to a logic high level or from a logic high level to a logic low level.

If a data voltage is output as the cell voltage VC, the offset canceling circuit 100a may output a second voltage, which is a voltage where a sensing voltage VSIG is added to the reference voltage VREF, as the output voltage VOUT. The analog-to-digital converter 500a may receive the second voltage as the output voltage VOUT from the offset canceling circuit 100a, and perform a signal conversion operation SIGNAL A/D that converts the second voltage into a second digital output signal. A sensor device including a sampling circuit 600d may extract a digital value corresponding to an effective signal component based on the first digital output signal and the second digital output signal.

As described above, the sampling circuit 600d may perform analog CDS or dual CDS by performing the reference conversion operation REFERENCE A/D and/or the signal conversion operation SIGNAL A/D.

Figure 19:
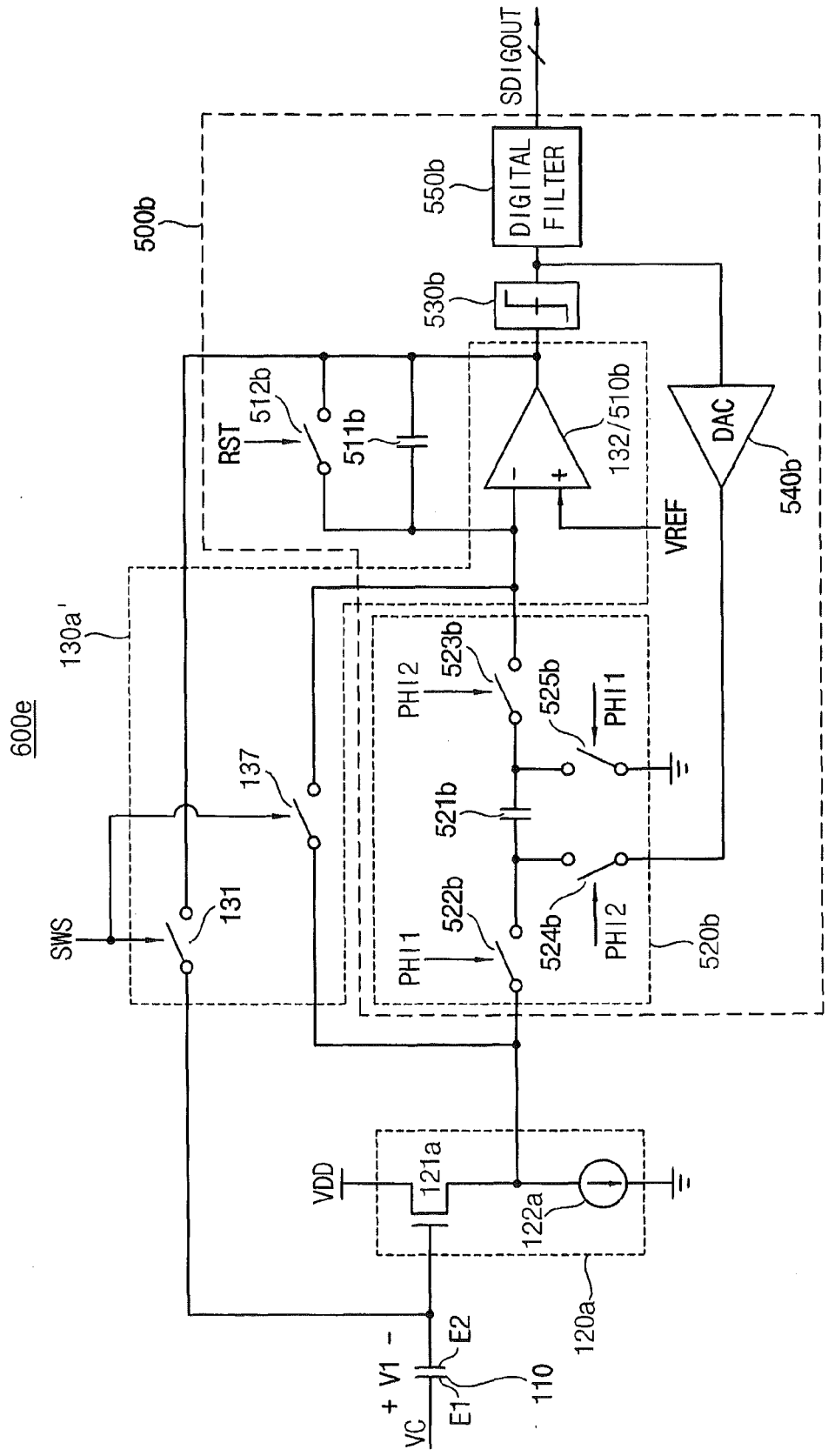
FIG. 19 is a circuit diagram illustrating a sampling circuit according to example embodiments.

FIG. 19 is a circuit diagram illustrating a sampling circuit according to example embodiments.

A sampling circuit 600e of FIG. 19 may have a configuration substantially similar to that of sampling circuit 600d of FIG. 17 except that a shared amplifier 132/510b is used as an amplifier 132 of a feedback circuit 130a' and an amplifier 510b of an analog-to-digital converter 500b and that, compared to a feedback circuit 130 of FIG. 17, the feedback circuit 130a' of FIG. 19 further includes a switch 137 for directly applying an output signal of a buffer 120a to the amplifier 132.

Referring to FIG. 19, the shared amplifier 132/510b may operate not only as the amplifier 132 of the feedback circuit 130a' but also as the amplifier 510b of the analog-to-digital converter 500b. While a switching signal SWS has a logic high level, the shared amplifier 132/510b may operate as the amplifier 132 of the feedback circuit 130a'. Further, while the analog-to-digital converter 500b performs a reference conversion operation and/or a signal conversion operation, the shared amplifier 132/510b may operate as the amplifier 510b of the analog-to-digital converter 500b.

Figure 20:
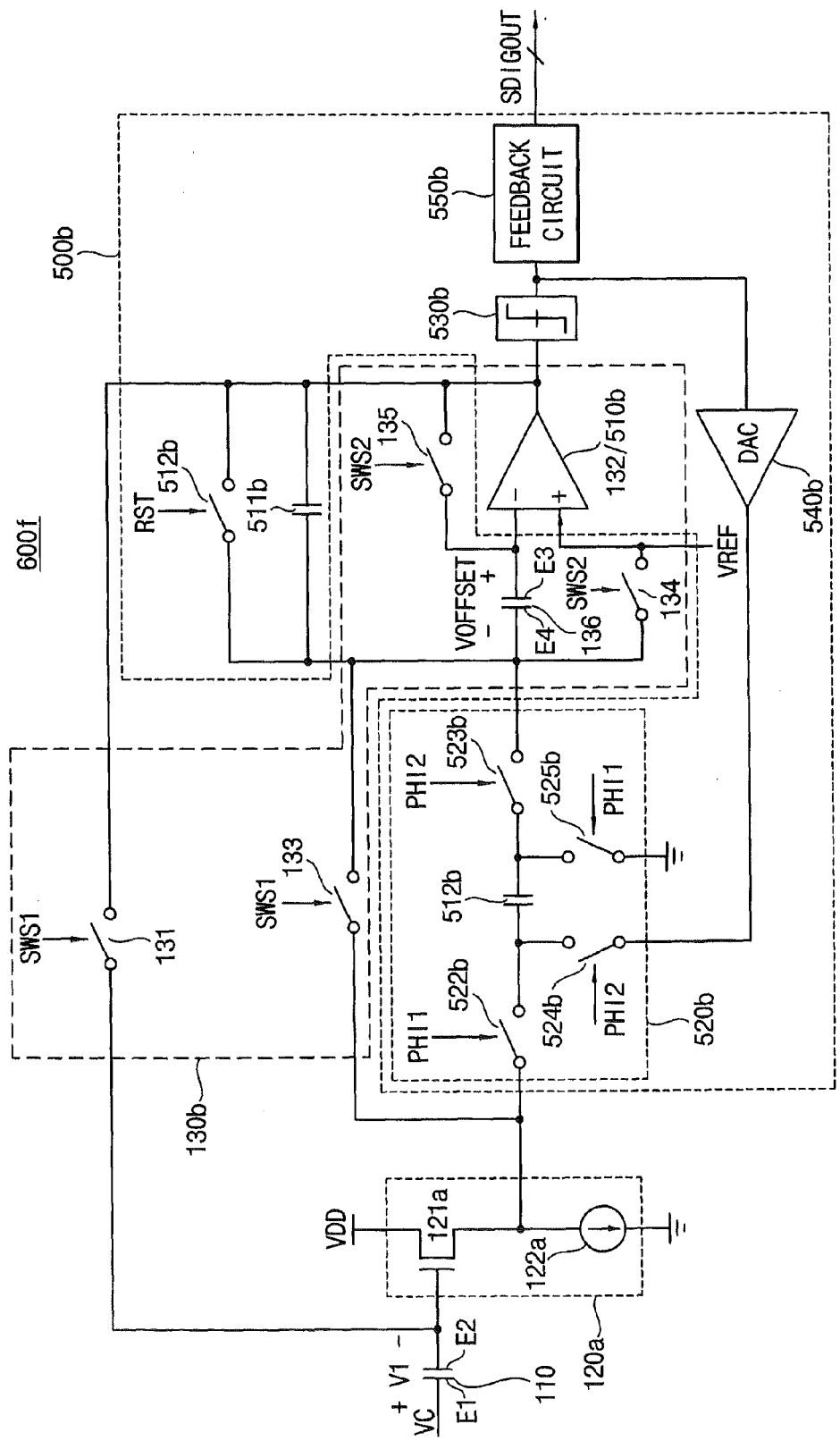
FIG. 20 is a circuit diagram illustrating a sampling circuit according to example embodiments.

FIG. 20 is a circuit diagram illustrating a sampling circuit according to example embodiments.

A sampling circuit 600f of FIG. 20 may have a configuration substantially similar to that of a sampling circuit 600e of FIG. 19 except that a feedback circuit 130b of FIG. 7 is used.

Referring to FIG. 20, a shared amplifier 132/510b may operate not only as an amplifier 132 of the feedback circuit 130b but also as the amplifier 510b of the analog-to-digital converter 500b. While a first switching signal SWS1 or a second switching signal SWS2 has a logic high level, the shared amplifier 132/510b may operate as the amplifier 132 of the feedback circuit 130b. Further, while the analog-to-digital converter 500b performs a reference conversion operation and/or a signal conversion operation, the shared amplifier 132/510b may operate as the amplifier 510b of the analog-to-digital converter 500b.

Hereinafter, an operation of the sampling circuit 600f will be described below with reference to FIG. 20.

While the second switching signal SWS2 has a logic high level, the shared amplifier 132/510b may receive a reference voltage from a reference voltage generator (not shown) or a ramp voltage generator (not shown), and an amplifier offset capacitor 136 may store charge corresponding to an offset VOFFSET of the shared amplifier 132/510b.

In some embodiments, the charging operation of the amplifier offset capacitor 136 may be performed before the first switching signal SWS1 has a logic high level. In other embodiments, the charging operation of the amplifier offset capacitor 136 may be performed substantially immediately before the analog-to-digital converter 500b performs the reference conversion operation and/or substantially immediately before the analog-to-digital converter 500b performs the signal conversion operation. In still other embodiments, the charging operation of the amplifier offset capacitor 136 may be performed before the first switching signal SWS1 has a logic high level and before the analog-to-digital converter 500b performs the reference conversion operation and/or the signal conversion operation.

While a reset voltage is output as a cell voltage VC, the first switching signal SWS1 may have a logic high level during a predetermined period of time. While the first switching signal SWS1 may have a logic high level, a decoupling capacitor 110 may store charge corresponding to a first voltage, which corresponds to a voltage difference between the reset voltage and the reference voltage VREF. In some embodiments, the analog-to-digital converter 500b may perform the reference conversion operation after the decoupling capacitor 110 stores the charge corresponding to the first voltage.

While a data voltage is output as the cell voltage VC, the analog-to-digital converter 500b may perform the signal conversion operation.

As described above, the sampling circuit 600f may cancel an offset of a unit cell and an offset of the amplifier 132/510b using the decoupling capacitor 110 and the amplifier offset capacitor 136. Further, the sampling circuit 600f may generate the digital output signal corresponding to an effective signal component by performing analog CDS or dual CDS. In addition, the sampling circuit 600f may use the shared amplifier 132/510b, thereby reducing a circuit size.

Figure 21:
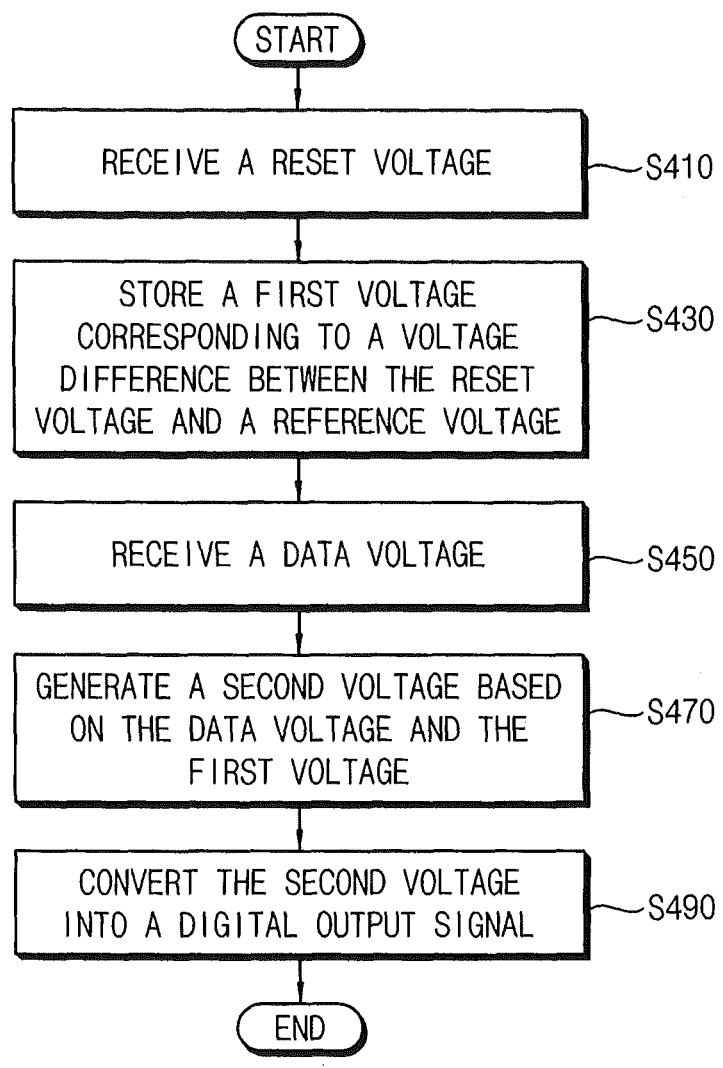
FIG. 21 is a flow chart illustrating a method of sampling a signal according to example embodiments.

FIG. 21 is a flow chart illustrating a method of sampling a signal according to example embodiments.

Referring to FIGS. 11 and 21, a sampling circuit 600 may receive a reset voltage from a unit cell 200 (S410). An offset canceling circuit 100 may store charge corresponding to a first voltage, which corresponds to a voltage difference between the reset voltage and a reference voltage VREF (S430).

The sampling circuit 600 may receive a data voltage from the unit cell 200 (S450). The offset canceling circuit 100 may output as an output voltage VOUT a second voltage corresponding to a voltage difference between the data voltage and the first voltage (S470). Accordingly, the offset canceling circuit 100 may output the second voltage where an offset of the unit cell 200 is canceled.

An analog-to-digital converter 500 may perform a signal conversion operation that converts the second voltage into a digital output signal SDIGOUT using the reference voltage VREF as a reference point. As described above, the sampling circuit 600 according to some example embodiments may perform analog CDS that extracts an effective signal component in an analog manner.

Figure 22:
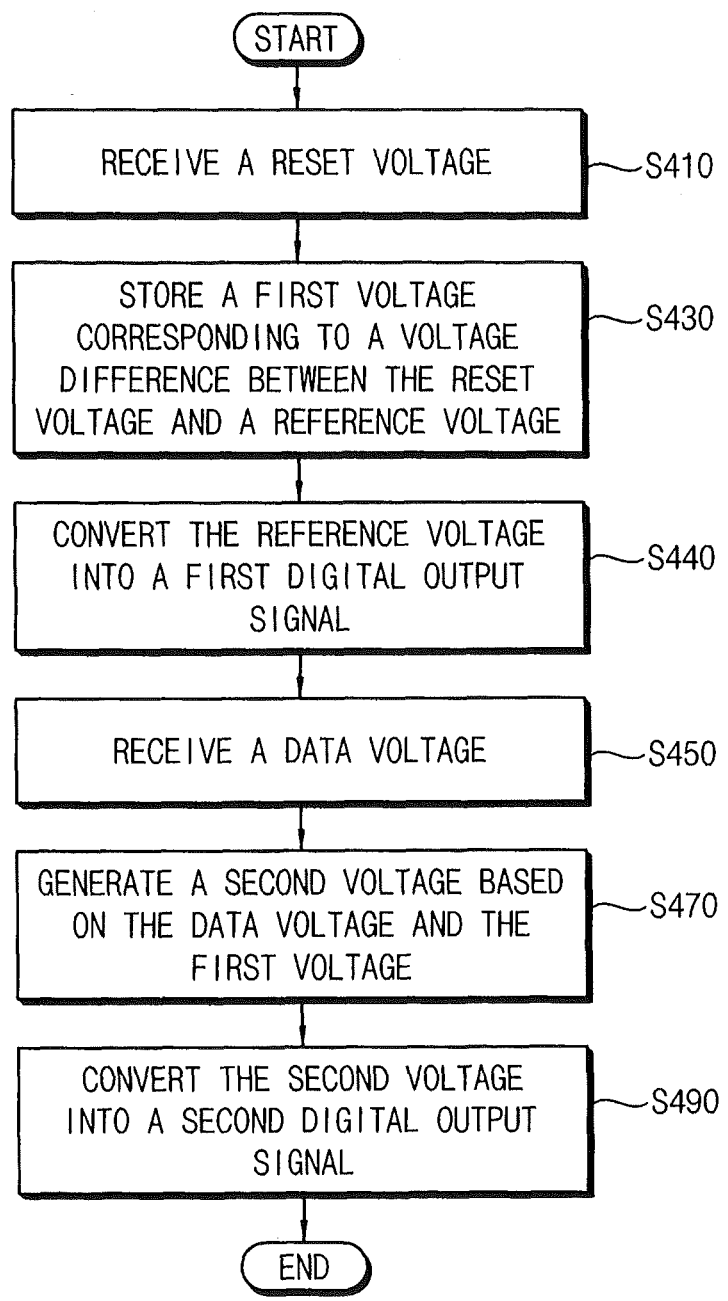
FIG. 22 is a flow chart illustrating a method of sampling a signal according to example embodiments.

FIG. 22 is a flow chart illustrating a method of sampling a signal according to example embodiments.

Referring to FIGS. 11 and 22, a sampling circuit 600 may receive a reset voltage from a unit cell 200 (S410). An offset canceling circuit 100 may store charge corresponding to a first voltage, which corresponds to a voltage difference between the reset voltage and a reference voltage VREF (S430).

An analog-to-digital converter 500 may perform a reference conversion operation that converts the reference voltage VREF into a first digital output signal (S440).

The sampling circuit 600 may receive a data voltage from the unit cell 200 (S450). The offset canceling circuit 100 may output as an output voltage VOUT a second voltage corresponding to a voltage difference between the data voltage and the first voltage (S470). Accordingly, the offset canceling circuit 100 may output the second voltage where an offset of the unit cell 200 is canceled.

The analog-to-digital converter 500 may perform a signal conversion operation that converts the second voltage into a second digital output signal. As described above, the sampling circuit 600 according to other example embodiments may perform dual CDS by performing the reference conversion operation and the signal conversion operation.

Figure 23:
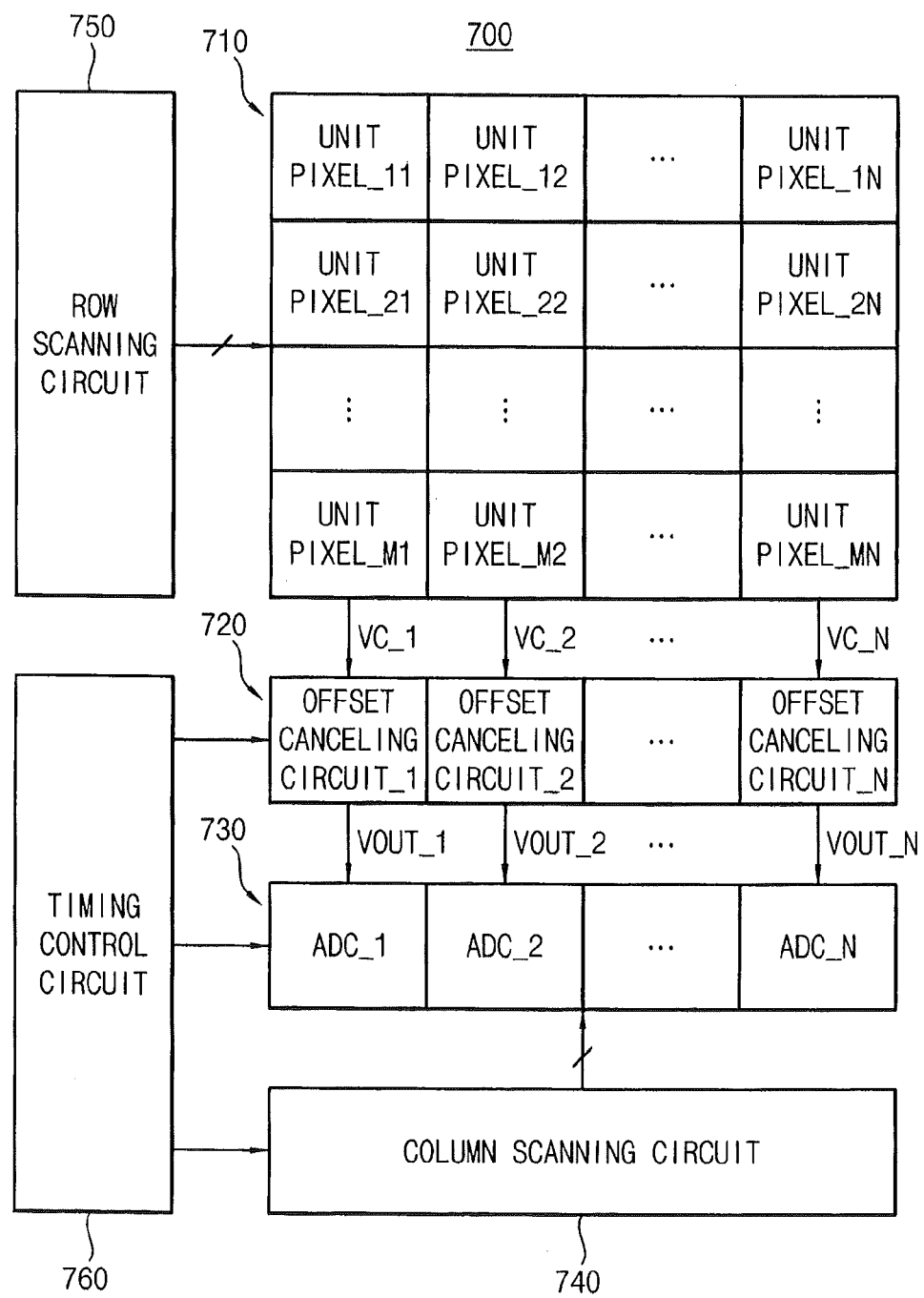
FIG. 23 is a block diagram illustrating an image sensor according to example embodiments.

FIG. 23 is a block diagram illustrating an image sensor according to example embodiments.

Referring to FIG. 23, an image sensor 700 includes a pixel array 710, an offset canceling unit 720, an analog-to-digital conversion unit 730, a column scanning circuit 740, a row scanning circuit 750 and a timing control circuit 760. The analog-to-digital conversion unit 730 may include a plurality of analog-to-digital converters ADC_1, ADC_2 and ADC_N respectively coupled to a plurality of column lines of the pixel array 710. Thus, the image sensor 700 may use a column ADC technique.

The pixel array 710 may include a plurality of unit pixels. The unit pixels may be arranged in a matrix form including a plurality of rows and a plurality of columns. Each unit pixel may include a photoelectric conversion device and a signal generation circuit. The unit pixels may be classified into a three-transistor pixel, a four-transistor pixel, a five-transistor pixel, a six-transistor pixel, etc. according to the number of transistors included in the signal generation circuit. The pixel array 710 may include one row line per row and one column line per column. For example, in a case where the pixel array 710 includes M*N unit pixels, where each of M and N is an integer greater than 1, the pixel array 710 may include M row lines and N column lines.

The row scanning circuit 750 may control a row address and a row scan of the pixel array 710 through the row lines, and the column scanning circuit 740 may control a column address and a column scan of the pixel array 710 through the column lines. In some embodiments, in a case where the image sensor 700 uses a Bayer pattern technique, the unit pixels of the pixel array 710 may receive red light (R), green light (G) and blue light (B), respectively. In other embodiments, each unit pixel of the pixel array 710 may receive magenta light (Mg), yellow light (Y), cyan light (Cy) and/or white light (W), respectively. In some embodiments, in a case where the image sensor 700 may use an auto dark level compensation (ADLC) technique, the pixel array 710 may include, in a peripheral region, an optical black pixel array (not shown) where incident light is blocked.

The offset canceling unit 720 may include a plurality of offset canceling circuits respectively coupled to the column lines. The offset canceling unit 720 may receive a plurality of reset voltages and a plurality of data voltages as a plurality of cell voltages VC_1, VC_2 and VC_N from the pixel array 710, and may provide a plurality of output voltages VOUT_1, VOUT_2 and VOUT_N to the analog-to-digital conversion unit 730. The offset canceling unit 720 may store a plurality of voltage differences of the plurality of reset voltages with respect to a reference voltage, and may generate the plurality of output voltages VOUT_1, VOUT_2 and VOUT_N based on the plurality of data voltages and the plurality of voltage differences.

The analog-to-digital conversion unit 730 may include the plurality of analog-to-digital converters ADC_1, ADC_2 and ADC_N respectively coupled to the column lines. The analog-to-digital conversion unit 730 may perform a reference conversion operation and/or a signal conversion operation. The analog-to-digital conversion unit 730 may be controlled by the timing control circuit 760 to perform the reference conversion operation and/or the signal conversion operation. The reference conversion operation or the signal conversion operation may be performed with a row scan period in which the row scanning circuit 750 selects a row line of the pixel array 710.

The row scanning circuit 750 may receive control signals from the timing control circuit 760 to control the row address and the row scan of the pixel array 710. The row scanning circuit 750 may apply a signal for activating a selected row line to the pixel array 710. In some embodiments, the row scanning circuit 750 may include a row decoder that selects a row line of the pixel array 710, and a row driver that provides the signal for activating the selected row line. The column scanning circuit 740 may receive control signals from the timing control circuit 760 to control the column address and the column scan of the pixel array 710. The column scanning circuit 740 may output a digital output signal of the analog-to-digital conversion unit 730 to a digital signal processing circuit or an external host. For example, the column scanning circuit 740 may output a horizontal scan control signal to the analog-to-digital conversion unit 730 to sequentially select at least one of the analog-to-digital converters ADC_1, ADC_2 and ADC_N. In some embodiments, the column scanning circuit 740 may include a column decoder that selects at least one of the analog-to-digital converters ADC_1, ADC_2 and ADC_N, and a column driver that applies an output of the selected analog-to-digital converter to a horizontal transmission line. The horizontal transmission line may have various bit widths for output the digital output signal.

The timing control circuit 760 may control the offset canceling circuit 720, the analog-to-digital conversion unit 730, the column scanning circuit 740 and the row scanning circuit 750. The timing control circuit 760 may provide control signals, such as a clock signal, a timing control signal, etc. to the offset canceling circuit 720, the analog-to-digital conversion unit 730, the column scanning circuit 740 and the row scanning circuit 750. In some embodiments, the timing control circuit 760 may include a logic control circuit, a phase locked loop circuit, a timing circuit, a communication interface circuit, etc. Although it is not illustrated in FIG. 23, the image sensor 700 may further include a reference voltage generator that generates a reference voltage and/or a ramp voltage.

Figure 24:
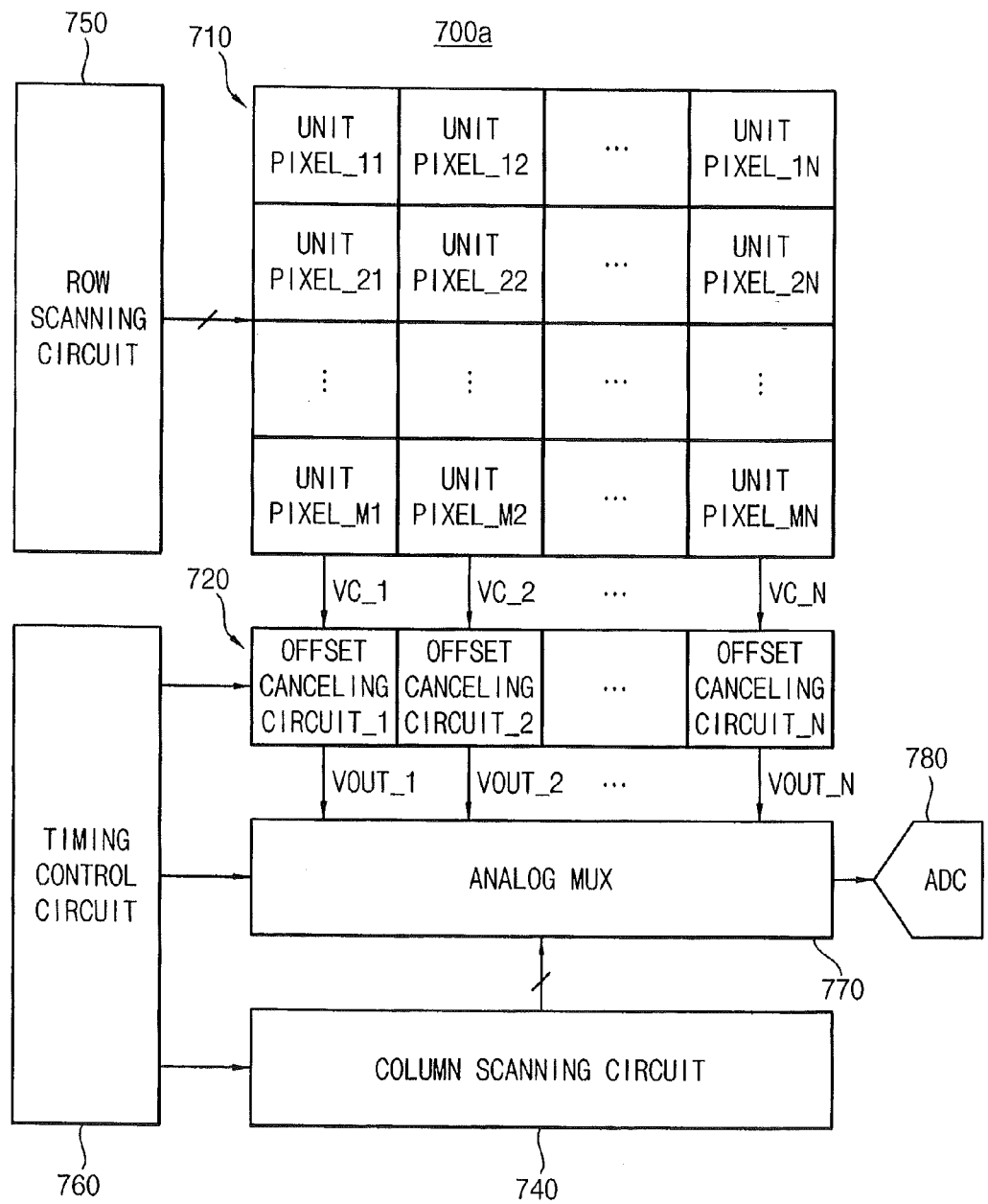
FIG. 24 is a block diagram illustrating an image sensor according to example embodiments.

FIG. 24 is a block diagram illustrating an image sensor according to example embodiments.

Referring to FIG. 24, an image sensor 700a includes a pixel array 710, an offset canceling unit 720, a column scanning circuit 740, a row scanning circuit 750, a timing control circuit 760, an analog multiplexer 770 and an analog-to-digital conversion unit 780. The image sensor 700a of FIG. 24 may have a configuration substantially similar to that of an image sensor 700 of FIG. 23 except for configurations of the analog multiplexer 770 and the analog-to-digital conversion unit 780.

The analog multiplexer 770 may sequentially output analog voltages corresponding to effective signal components received through a plurality of column lines. The analog-to-digital conversion unit 780 may include a single analog-to-digital converter that converts the analog voltage sequentially output from the analog multiplexer 770 into a digital output signal. That is, the image sensor 700a may use a single ADC technique using one analog-to-digital converter. Because the image sensor 700a includes one analog-to-digital converter for converting output signals of the plurality of column lines, the image sensor 700a may be reduced in size.

FIGS. 25A through 25D are circuit diagrams illustrating unit pixels included in an image sensor according to example embodiments.

Figure 25A:
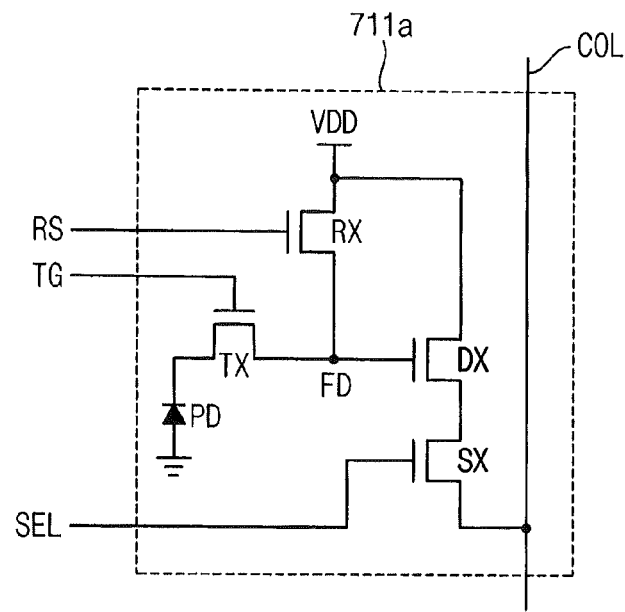
FIGS. 25A through 25D are circuit diagrams illustrating unit pixels included in an image sensor according to example embodiments.

Referring to FIG. 25A, a unit pixel 711a according to some example embodiments may include a photo sensitive device PD, a transfer transistor TX, a floating diffusion node FD, a reset transistor RX, a drive transistor DX and a select transistor SX.

The photo sensitive device PD may generate photo-charges based on incident light. In some embodiments, the photo sensitive device PD may receive a control signal to be turned on or off. In this case, the photo sensitive device PD may generate the photo-charges when the photo sensitive device PD is turned on, and may not generate the photo-charges when the photo sensitive device PD is turned off. In some embodiments, the photo sensitive device PD may include a photodiode, a phototransistor, a photogate, a pinned photodiode or a combination thereof.

The photo-charges generated by the photo sensitive device PD may be transferred to the floating diffusion node FD by a gating operation of the transfer transistor TX. For example, while a transfer control signal TG has a first level (e.g., a high level), the transfer transistor TX may be turned on, and thus the photo-charges generated by the photo sensitive device PD may be transferred to the floating diffusion node FD.

The drive transistor DX may serve as a source follower buffer amplifier, and may buffer a signal corresponding to charges collected in the floating diffusion node FD.

The select transistor SX may perform a switching operation and an address operation for selecting the unit pixel 711a in response to a select control signal SEL.

The floating diffusion node FD may be reset by the reset transistor RX. For example, the reset transistor RX may reset the floating diffusion node FD with a fixed period for a CDS operation in response to a reset control signal RS.

Although FIG. 25A illustrates the unit pixel 711a including one photo sensitive device PD and four MOS transistors TX, RX, DX and SX, the unit pixels according to example embodiments are not limited thereto, and the inventive concepts, for example, may be applied to any circuits including a photo sensitive device and at least three transistors. Other example embodiments of the unit pixels are illustrated in FIGS. 25B through 25D.

Figure 25B:
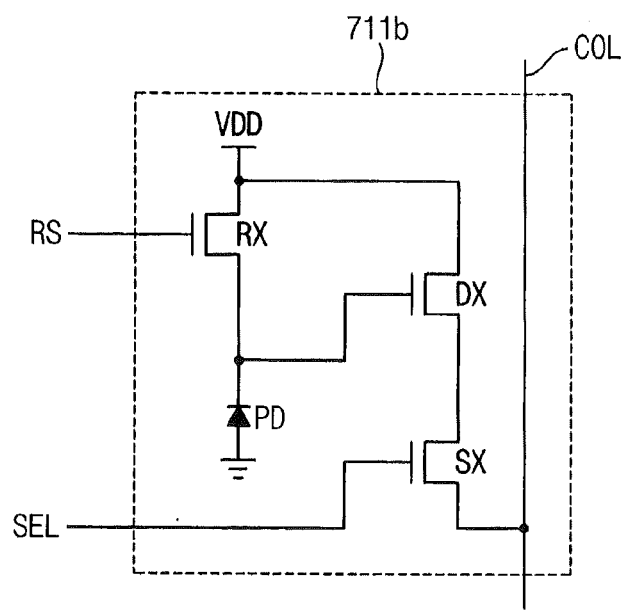

A unit pixel 711b of FIG. 25B may be a three-transistor pixel including a photo sensitive device PD, a reset transistor RX, a drive transistor DX (or a source follower transistor) and a select transistor SX.

Figure 25C:
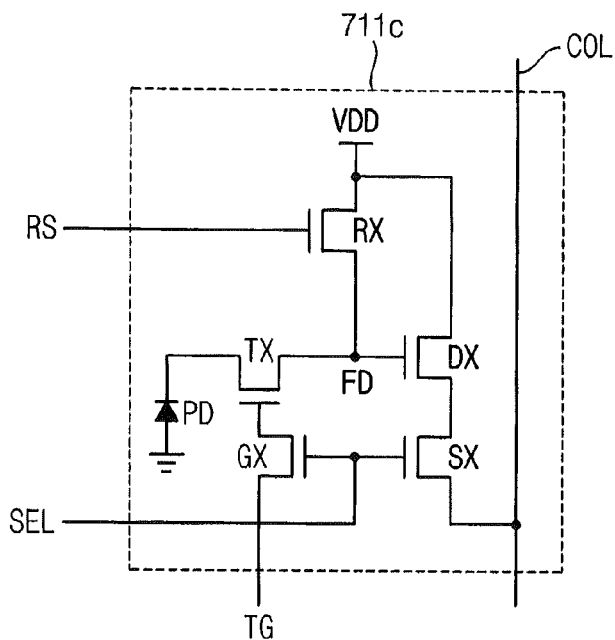

A unit pixel 711c of FIG. 25C may be a five-transistor pixel including a photo sensitive device PD, a transfer transistor TX, a reset transistor RX, a drive transistor DX (or a source follower transistor), a select transistor SX and another transistor GX.

Figure 25D:
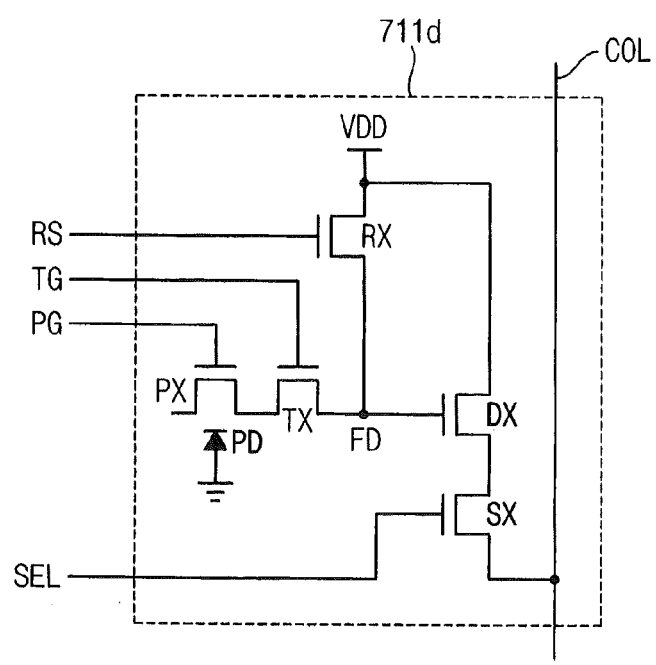

A unit pixel 711d of FIG. 25D may be a six-transistor pixel including a photo sensitive device PD, a transfer transistor TX, a reset transistor RX, a drive transistor DX (or a source follower transistor), a select transistor SX and two other transistors GX and PX.

With respect to the various types of unit pixels 711a, 711b, 711c and 711d illustrated in FIGS. 25A through 25D, each unit pixel 711a, 711b, 711c and 711d may have an independent structure, or two or more unit pixels may share at least one element. For example, with respect to the unit pixel 711a of FIG. 25A, two or four unit pixels 711a may share the floating diffusion node FD, the reset transistor RX, the drive transistor DX and the select transistor SX, and the two or four unit pixels 711a may independently operate by a timing control.

Figure 26:
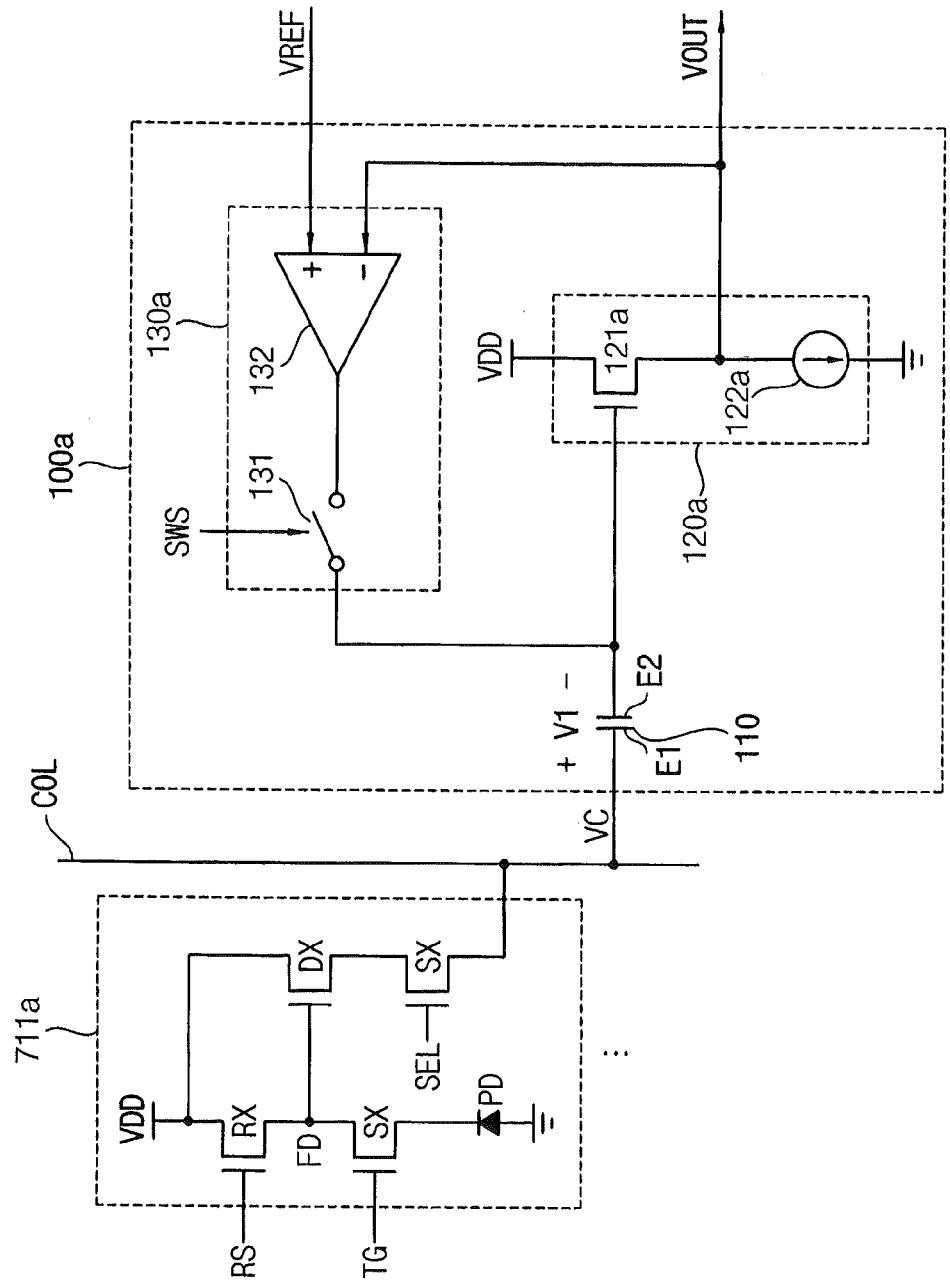
FIG. 26 is a circuit diagram illustrating a unit pixel and an offset canceling circuit included in an image sensor according to example embodiments.
Figure 27:
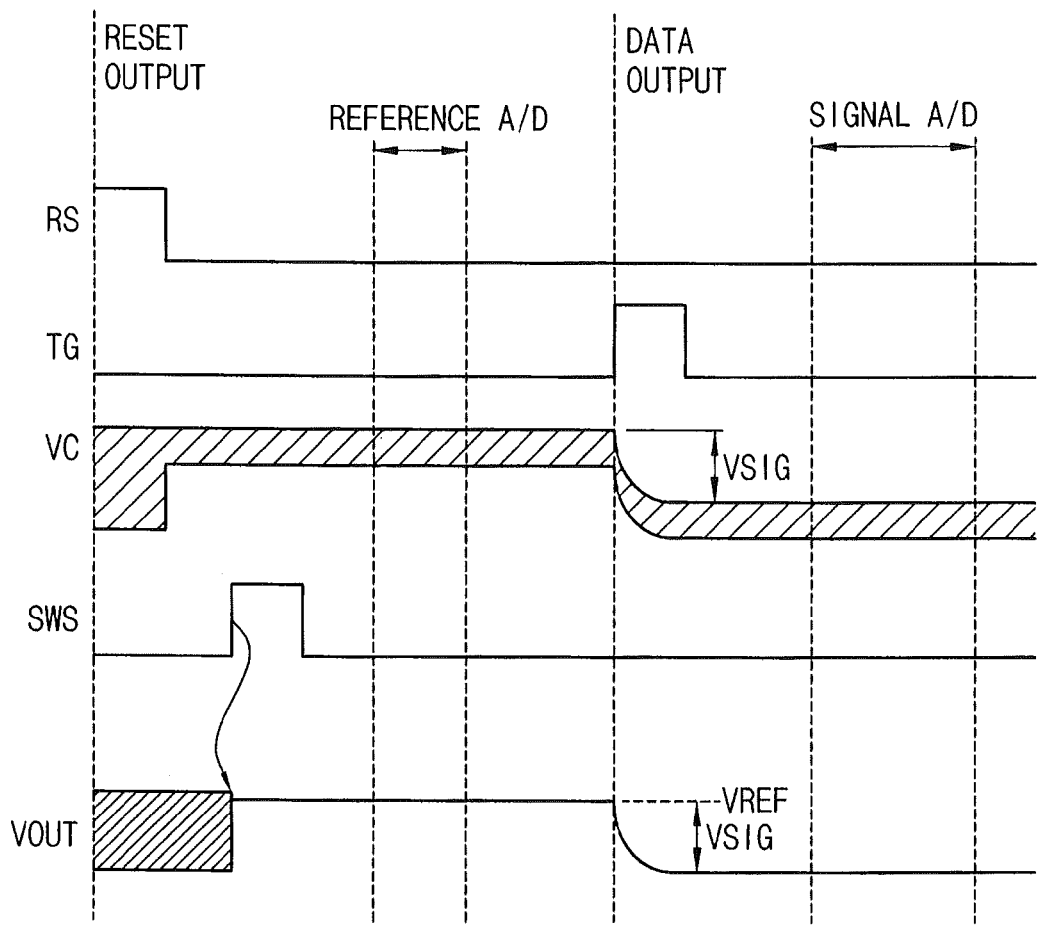
FIG. 27 is a timing diagram for describing an operation of a unit pixel and an offset canceling circuit illustrated in FIG. 26.

FIG. 26 is a circuit diagram illustrating a unit pixel and an offset canceling circuit included in an image sensor according to example embodiments, and FIG. 27 is a timing diagram for describing an operation of a unit pixel and an offset canceling circuit illustrated in FIG. 26.

Although FIG. 26 illustrates an example where a unit pixel 711a has a four-transistor structure, an image sensor according to example embodiments may include various types of unit pixels, such as a unit pixel 711b of a three-transistor structure illustrated in FIG. 25B, a unit pixel 711c of a five-transistor structure illustrated in FIG. 25C, a unit pixel 711d of a six-transistor structure illustrated in FIG. 25D, etc.

Referring to FIGS. 26 and 27, while a reset control signal RS has a logic high level, a reset transistor RX may be turned on, and the unit pixel 711a may output a reset voltage. While the reset voltage is output as a cell voltage VC, a switching signal SWS may have a logic high level during a predetermined period of time. If the switching signal SWS has a logic high level, a decoupling capacitor 110 may store a first voltage V1 corresponding to a voltage difference between the reset voltage and a reference voltage VREF, and an offset canceling circuit 100a may output an output voltage VOUT having a voltage level substantially the same as that of the reference voltage VREF. In some embodiments, an analog-to-digital conversion unit 730 of FIG. 23 or an analog-to-digital conversion unit 780 of FIG. 24 may receive the reference voltage VREF as the output voltage VOUT from the offset canceling circuit 100a, and may perform a reference conversion operation REFERENCE A/D that converts the reference voltage VREF into a first digital output signal.

If a transfer control signal TG has a logic high level, a transfer transistor TX may be turned on, and photo-charges generated by a photo sensitive device PD may be transferred to a floating diffusion node FD. The unit pixel 711a may output a data voltage via a drive transistor DX, a select transistor SX and a column line COL based on a voltage of the floating diffusion node FD. If the data voltage is output as the cell voltage VC, the offset canceling circuit 100a may output as the output voltage VOUT a second voltage corresponding to a voltage difference between the data voltage and the first voltage V1. The analog-to-digital conversion unit 730 of FIG. 23 or the analog-to-digital conversion unit 780 of FIG. 24 may receive the second voltage as the output voltage VOUT from the offset canceling circuit 100a, and may perform a signal conversion operation SIGNAL A/D that converts the second voltage into a second digital output signal.

As described above, an image sensor including the unit pixel 711a and the offset canceling circuit 100a may perform analog CDS or dual CDS by performing the reference conversion operation REFERENCE A/D and/or the signal conversion operation SIGNAL A/D.

Figure 28:
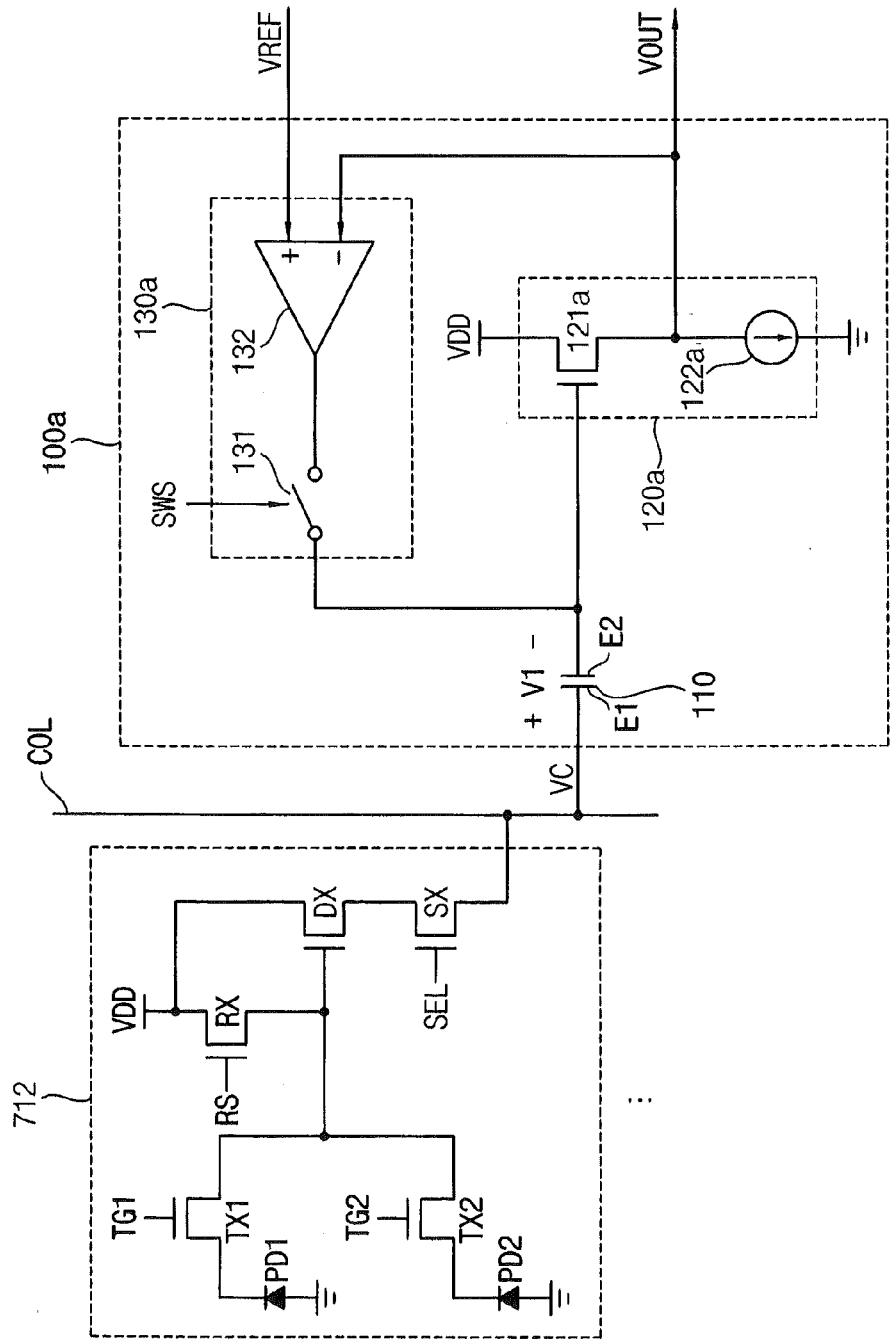
FIG. 28 is a circuit diagram illustrating a shared unit pixel and an offset canceling circuit included in an image sensor according to example embodiments.
Figure 29:
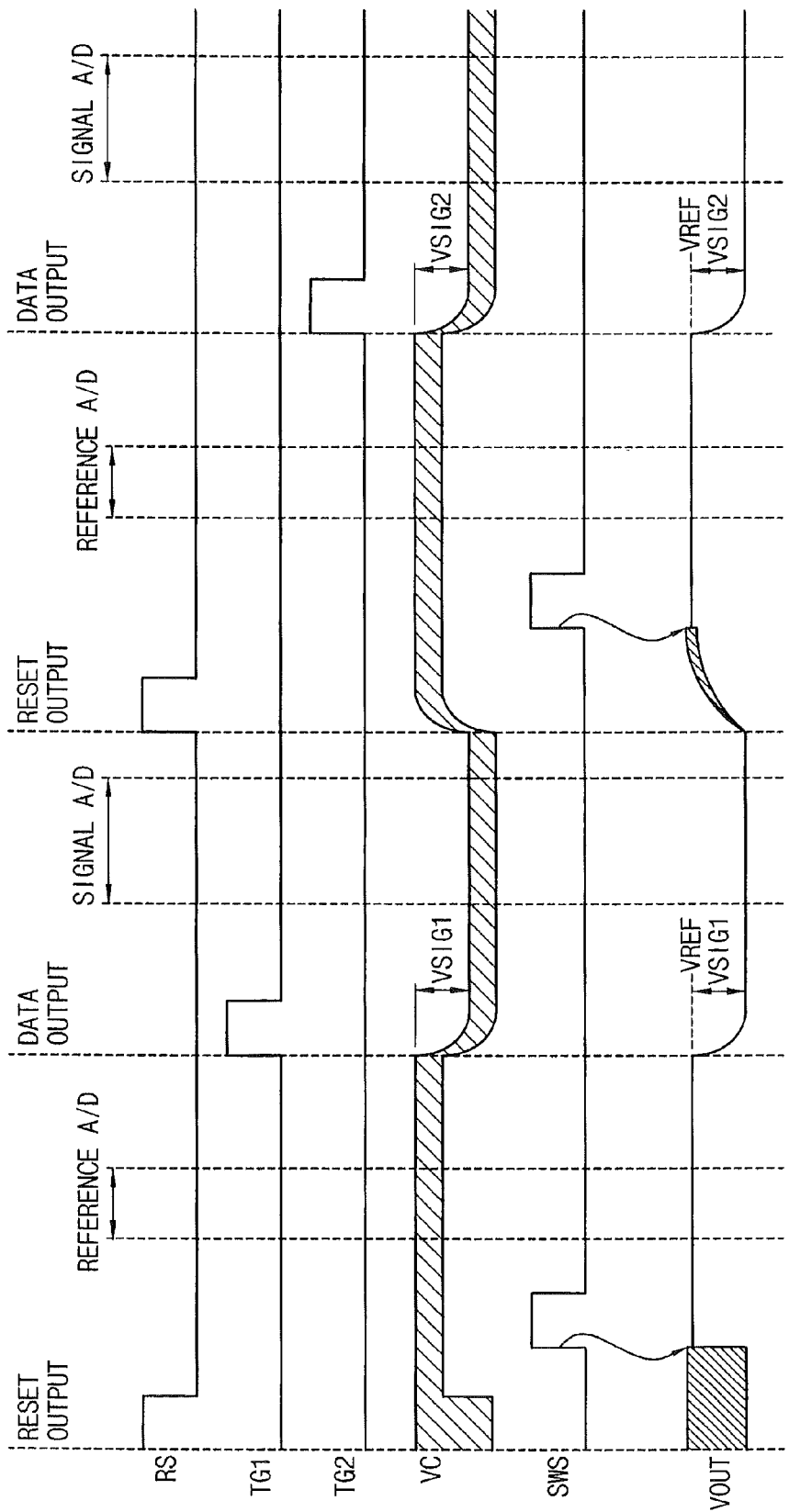
FIG. 29 is a timing diagram for describing an operation of a shared unit pixel and an offset canceling circuit illustrated in FIG. 28.

FIG. 28 is a circuit diagram illustrating a shared unit pixel and an offset canceling circuit included in an image sensor according to example embodiments, and FIG. 29 is a timing diagram for describing an operation of a shared unit pixel and an offset canceling circuit illustrated in FIG. 28.

Referring to FIG. 28, an image sensor includes a shared unit pixel 712 where a reset transistor RX, a drive transistor DX and a select transistor SX are shared by two unit pixels. Since the two unit pixels share the transistors RX, DX and SX, a rate of size occupied by a photo sensitive device PD may increase, and a fill factor of the image sensor may increase.

Referring to FIGS. 28 and 29, if a reset control signal RS has a logic high level, a reset transistor RX may be turned on, and the shared unit pixel 712 may output a first reset voltage through a column line COL. Thereafter, if a switching signal SWS has a logic high level, an offset canceling circuit 100a may output an output voltage VOUT having a voltage level substantially the same as that of the reference voltage VREF. An analog-to-digital conversion unit 730 of FIG. 23 or an analog-to-digital conversion unit 780 of FIG. 24 may perform a first reference conversion operation REFERENCE A/D that converts the reference voltage VREF into a first digital output signal.

If a first transfer control signal TG1 has a logic high level, a first transfer transistor TX1 may be turned on, and photo-charges generated by a first photo sensitive device PD1 may be transferred to a floating diffusion node FD. The shared unit pixel 712 may output a first data voltage via the drive transistor DX, the select transistor SX and the column line COL based on a voltage of the floating diffusion node FD. The offset canceling circuit 100a may output as the output voltage VOUT a voltage where a first sensing voltage VSIG1 is added to the reference voltage VREF. The analog-to-digital conversion unit 730 of FIG. 23 or the analog-to-digital conversion unit 780 of FIG. 24 may perform a first signal conversion operation SIGNAL A/D that converts the voltage where the first sensing voltage VSIG1 is added to the reference voltage VREF into a second digital output signal.

If the reset control signal RS again has a logic high level, the reset transistor RX may be turned on, and the shared unit pixel 712 may output a second reset voltage through a column line COL. Thereafter, if the switching signal SWS again has a logic high level, the offset canceling circuit 100a may output an output voltage VOUT having a voltage level substantially the same as that of the reference voltage VREF. The analog-to-digital conversion unit 730 of FIG. 23 or the analog-to-digital conversion unit 780 of FIG. 24 may perform a second reference conversion operation REFERENCE A/D that converts the reference voltage VREF into a third digital output signal.

If a second transfer control signal TG2 has a logic high level, a second transfer transistor TX2 may be turned on, and photo-charges generated by a second photo sensitive device PD2 may be transferred to the floating diffusion node FD. The shared unit pixel 712 may output a second data voltage via the drive transistor DX, the select transistor SX and the column line COL based on a voltage of the floating diffusion node FD. The offset canceling circuit 100a may output as the output voltage VOUT a voltage where a second sensing voltage VSIG2 is added to the reference voltage VREF. The analog-to-digital conversion unit 730 of FIG. 23 or the analog-to-digital conversion unit 780 of FIG. 24 may perform a second signal conversion operation SIGNAL A/D that converts the voltage where the second sensing voltage VSIG2 is added to the reference voltage VREF into a fourth digital output signal.

As described above, although two or more unit pixels share transistors RX, DX and SX, the two or more unit pixels may independently operate by a timing control.

Figure 30:
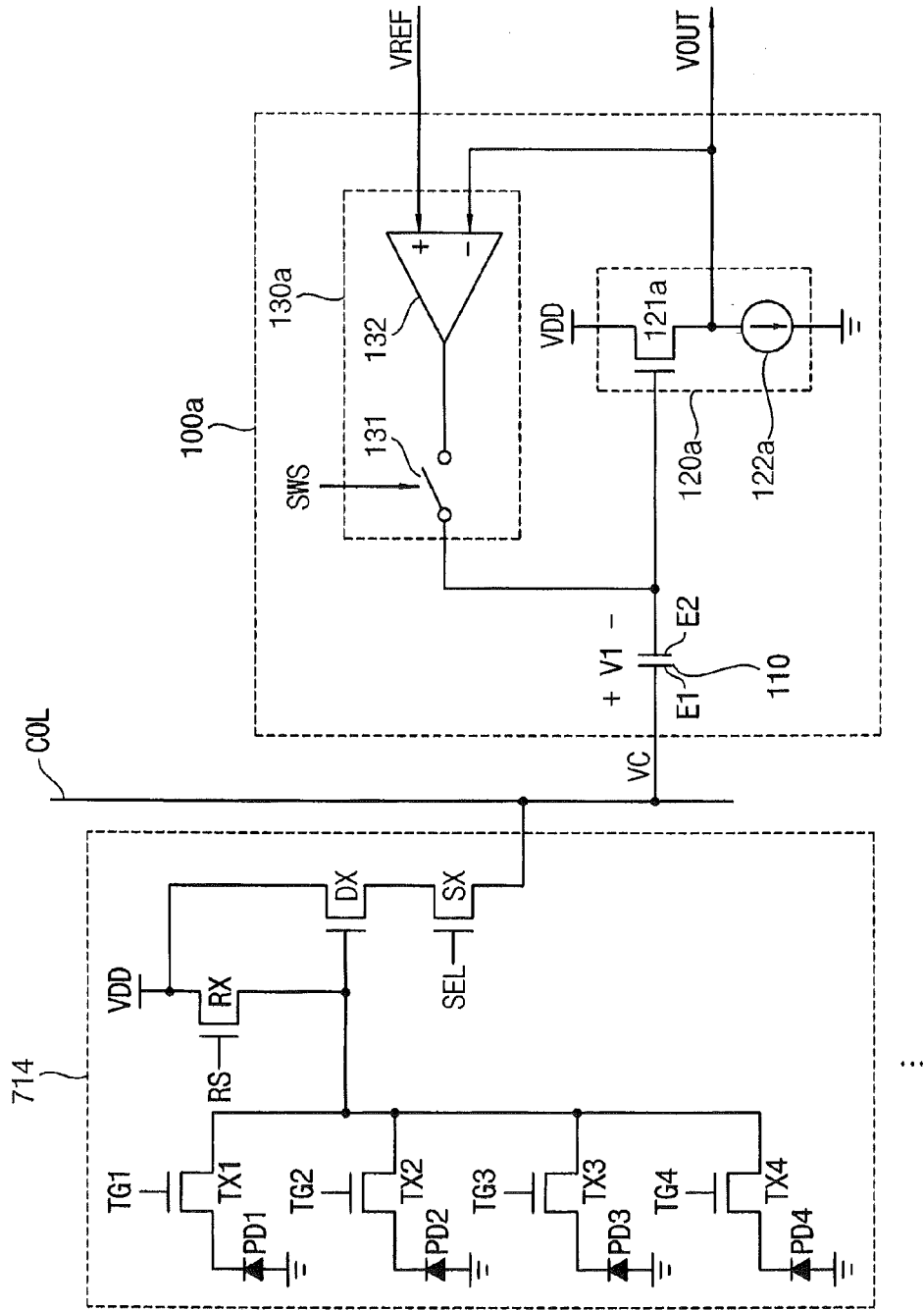
FIG. 30 is a circuit diagram illustrating a shared unit pixel and an offset canceling circuit included in an image sensor according to example embodiments.

FIG. 30 is a circuit diagram illustrating a shared unit pixel and an offset canceling circuit included in an image sensor according to example embodiments.

Referring to FIG. 30, an image sensor may include a shared unit pixel 714 where four unit pixels share a reset transistor RX, a drive transistor DX and a select transistor SX. Because the four unit pixels share the transistors RX, DX and SX, a rate of size occupied by a photo sensitive device PD may increase, and a fill factor of the image sensor may increase. Although the four unit pixels share the transistors RX, DX and SX, the four unit pixels may independently operate by a timing control.

Although FIGS. 28 and 30 illustrate examples where two unit pixels and four unit pixels share transistors RX, DX and SX, respectively, in some embodiments, three unit pixels or five or more unit pixels may share at least one transistor.

Figure 31:
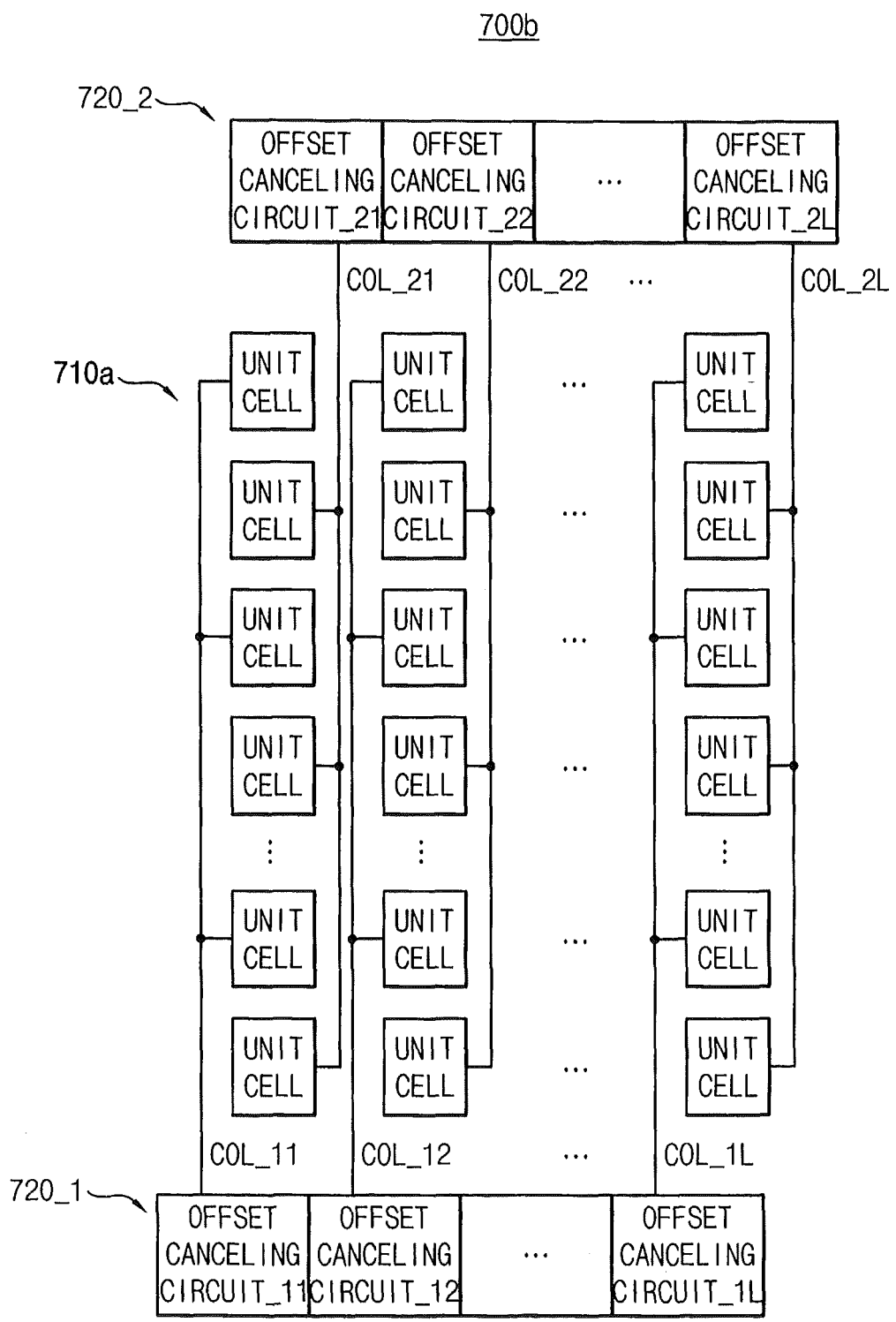
FIG. 31 is a block diagram illustrating an image sensor according to example embodiments.

FIG. 31 is a block diagram illustrating an image sensor according to example embodiments.

FIG. 31 illustrates a portion of an image sensor 700b. Referring to FIG. 31, a pixel array 710a may include a plurality of unit pixels arranged in a matrix form including a plurality of rows and a plurality of columns. The pixel array 710a may further include at least two offset canceling circuit arrays 720_1 and 720_2, each includes a plurality of offset canceling circuits respectively coupled to the plurality of columns. For example, in a case where the pixel array 710a includes M*L unit pixels, where each of M and L is an integer greater than 1, the pixel array 710a may include L first column lines COL_11, COL12 and COL_1L and L second column lines COL_21, COL_22 and COL_2L, a first offset canceling circuit array 720_1 may include L offset canceling circuits respectively coupled to the first column lines COL_11, COL12 and COL_1L, and a second offset canceling circuit array 720_2 may include L offset canceling circuits respectively coupled to the second column lines COL_21, COL_22 and COL_2L.

Unit pixels of the pixel array 710a may be coupled to the first column lines COL_11, COL12 and COL_1L and the second column lines COL_21, COL_22 and COL_2L, and two rows of the unit pixels may be read substantially at the same time. For example, cell voltages of a first row of the unit pixels may be read through the first column lines COL_11, COL12 and COL_1L, and cell voltages of a second row of the unit pixels may be read through the second column lines COL_21, COL_22 and COL_2L. The first offset canceling circuit array 720_1 may cancel offsets of the cell voltages of the first row of the unit pixels, and the second offset canceling circuit array 720_2 may cancel offsets of the cell voltages of the second row of the unit pixels. The cell voltages of the first row of the unit pixels may be converted into first digital output signals by a first analog-to-digital converter array or a first one analog-to-digital converter, and the cell voltages of the second row of the unit pixels may be converted into second digital output signals by a second analog-to-digital converter array or a second one analog-to-digital converter.

Although FIG. 31 illustrates an example where odd-numbered rows of unit pixels are coupled to the first column lines COL_11, COL_12 and COL_1L, and even-numbered rows of unit pixels are coupled to the second column lines COL_21, COL_22 and COL_2L, the unit pixels and the column lines may be coupled in various manners.

Figure 32:
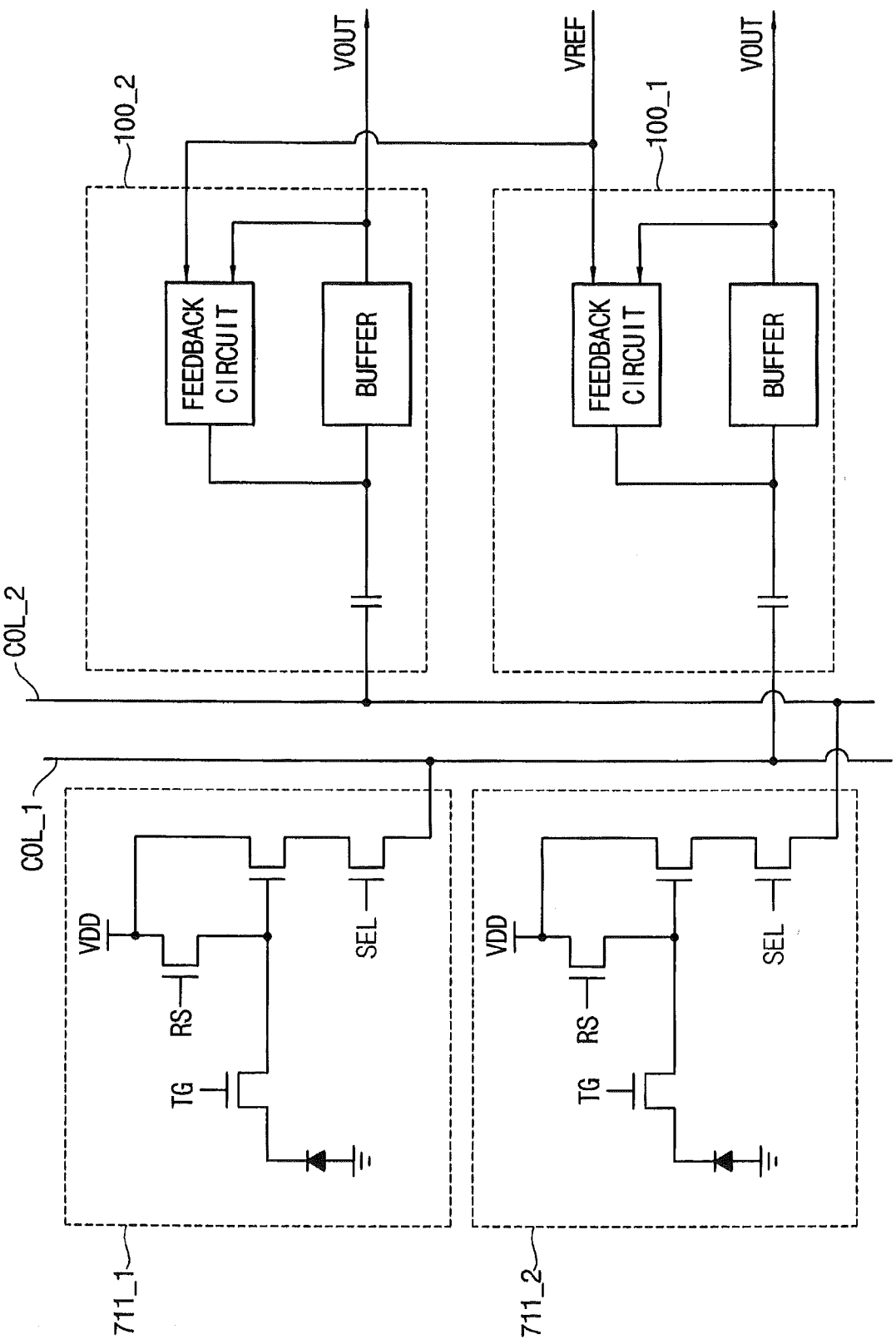
FIG. 32 is a circuit diagram illustrating a unit pixel and an offset canceling circuit included in an image sensor of FIG. 31 according to example embodiments.

FIG. 32 is a circuit diagram illustrating a unit pixel and an offset canceling circuit included in an image sensor of FIG. 31 according to example embodiments.

Referring to FIG. 32, a first unit pixel 711_1 may be coupled to a first offset canceling circuit 100_1 via a first column line COL_1, and a second unit pixel 711_2 may be coupled to a second offset canceling circuit 100_2 via a second column line COL_2. The first unit pixel 711_1 and the second unit pixel 711_2 may substantially simultaneously receive control signals, such as a reset control signal RS, a transfer control signal TG and a select control signal SEL, and may substantially simultaneously perform readout operations.

Figure 33:
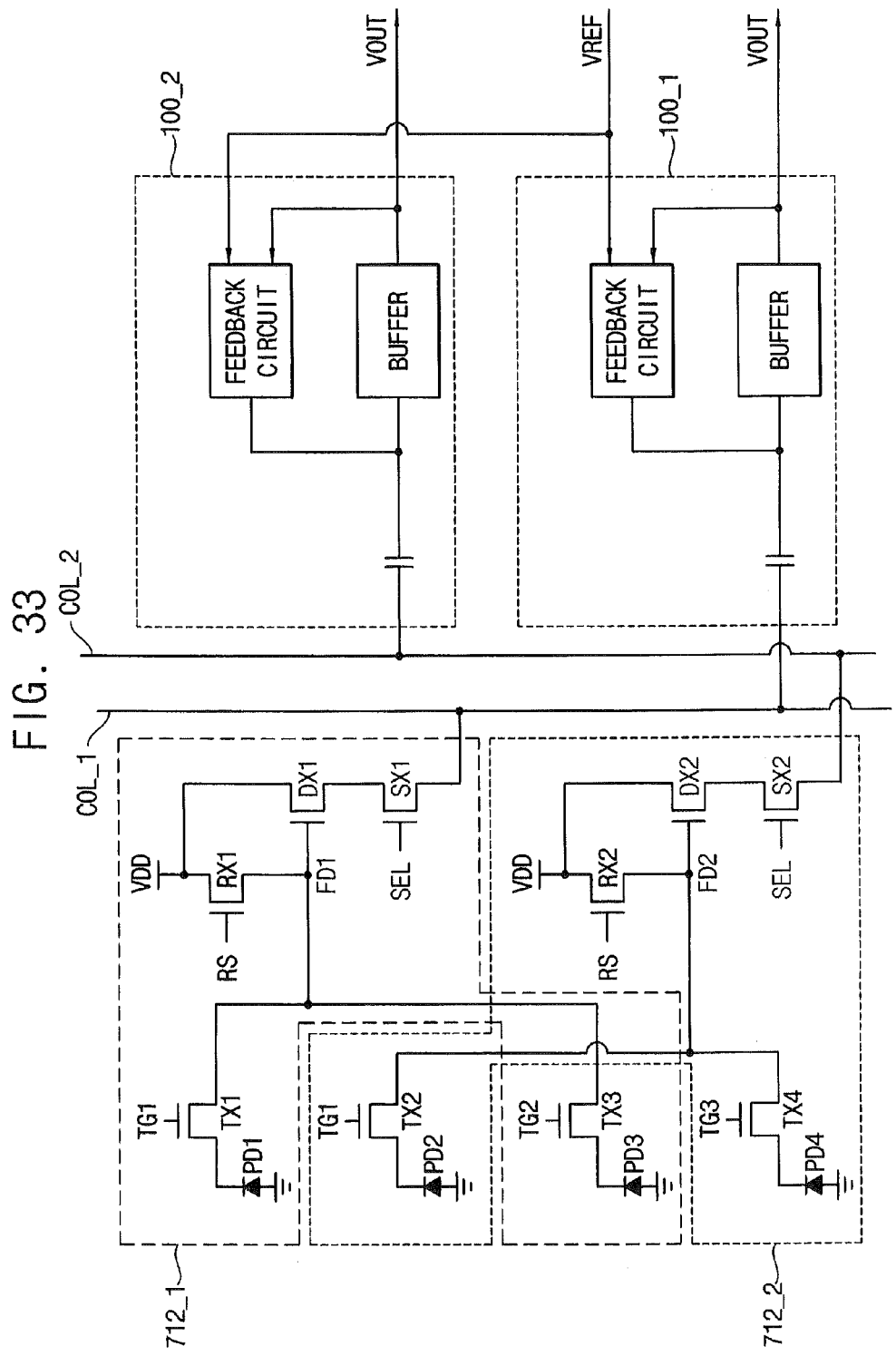
FIG. 33 is a circuit diagram illustrating a shared unit pixel and an offset canceling circuit included in an image sensor of FIG. 31 according to example embodiments.

FIG. 33 is a circuit diagram illustrating a shared unit pixel and an offset canceling circuit included in an image sensor of FIG. 31 according to example embodiments.

Referring to FIG. 33, a first shared unit pixel 712_1 may be coupled to a first offset canceling circuit 100_1 via a first column line COL_1, and a second shared unit pixel 712_2 may be coupled to a second offset canceling circuit 100_2 via a second column line COL_2. A first unit pixel including a first photo sensitive device PD1 and a first transfer transistor TX1 and a third unit pixel including a third photo sensitive device PD3 and a third transfer transistor TX3 may form a first shared unit pixel 712_1 by sharing a first reset transistor RX1, a first drive transistor DX1 and a first select transistor SX1. A second unit pixel including a second photo sensitive device PD2 and a second transfer transistor TX2 and a fourth unit pixel including a fourth photo sensitive device PD4 and a fourth transfer transistor TX4 may form a second shared unit pixel 712_2 by sharing a second reset transistor RX2, a second drive transistor DX2 and a second select transistor SX2. The first shared unit pixel 712_1 and the second shared unit pixel 712_2 may substantially simultaneously receive control signals, such as a first transfer control signal TG1, a second transfer control signal TG2, a reset control signal RS and a select control signal SEL, and may substantially simultaneously perform readout operations.

Figure 34:
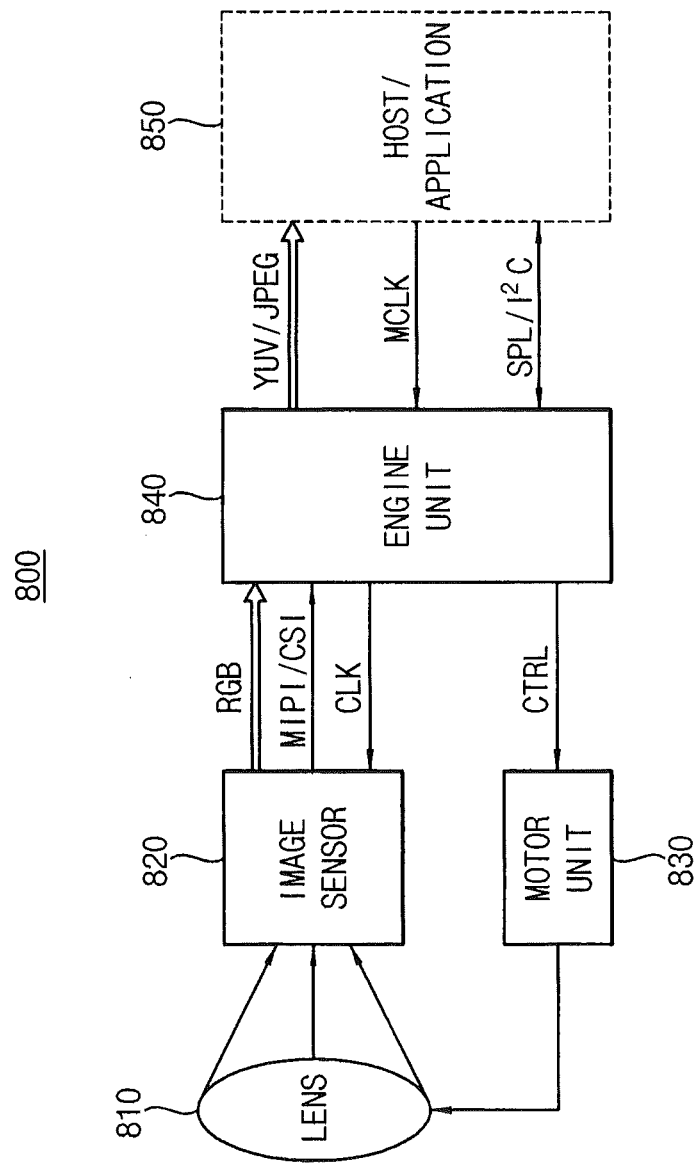
FIG. 34 is a block diagram illustrating a digital camera including an image sensor according to example embodiments.

FIG. 34 is a block diagram illustrating a digital camera including an image sensor according to example embodiments.

Referring to FIG. 34, a digital camera 800 includes a lens 810, an image sensor 820, a motor unit 830 and an engine unit 840. The image sensor 820 may be an image sensor 700 of FIG. 23, an image sensor 700a of FIG. 24 or an image sensor 700b of FIG. 31.

The lens 810 may focus incident light on a photo-receiving region of the image sensor 820. The image sensor 820 may generate RGB data of a Bayer pattern based on the incident light. The RGB data may be data where an offset is canceled by an offset canceling circuit or a sampling circuit. The image sensor 820 may provide the RGB data to the engine unit 840 in response to a clock signal CLK. In some embodiments, the image sensor 820 may interface with the engine unit 840 using a mobile industry processor interface (MIPI) and/or a camera serial interface (CSI). The motor unit 830 may control the focusing of the lens 810 or may perform shuttering in response to a control signal CTRL received from the engine unit 840. The engine unit 840 may control the image sensor 820 and the motor unit 830. The engine unit 840 may generate YUV data including a luminance component, a difference between the luminance component and a blue component, and a difference between the luminance component and a red component based on the RGB data, or may generate compressed data, such as joint photography experts group (JPEG) data. The engine unit 840 may be coupled to a host/application 850, and may provide the YUV data or the compressed data to the host/application 850 based on a master clock signal MCLK. In some embodiments, the engine unit 840 may interface with the host/application 850 using a serial peripheral interface (SPI) and/or an inter integrated circuit (I2C) interface.

Figure 35:
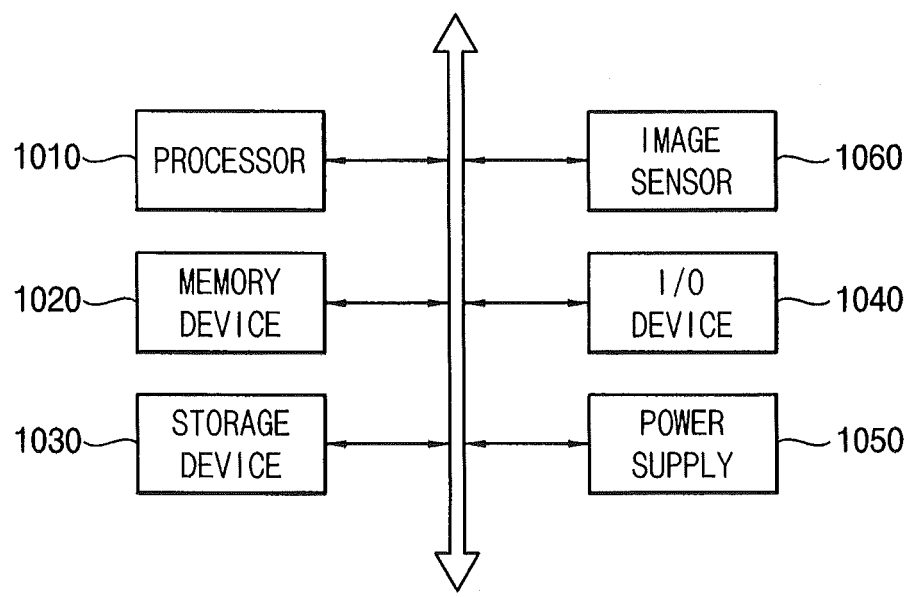
FIG. 35 is a block diagram illustrating a computing system including an image sensor according to example embodiments.

FIG. 35 is a block diagram illustrating a computing system including an image sensor according to example embodiments.

Referring to FIG. 35, a computing system 1000 includes a processor 1010, a memory device 1020, a storage device 1030, an input/output device 1040, a power supply 1050 and an image sensor 1060. The image sensor 1060 may be an image sensor 700 of FIG. 23, an image sensor 700a of FIG. 24 or an image sensor 700b of FIG. 31. Although it is not illustrated in FIG. 35, the computing system 1000 may further include a port for communicating with electronic devices, such as a video card, a sound card, a memory card, a USB device, etc.

The processor 1010 may perform specific calculations or tasks. For example, the processor 1010 may be a microprocessor, a central processing unit (CPU), a digital signal processor, or the like. The processor 1010 may communicate with the memory device 1020, the storage device 1030 and the input/output device 1040 via an address bus, a control bus and/or a data bus. The processor 1010 may be coupled to an extension bus, such as a peripheral component interconnect (PCI) bus. The memory device 1020 may store data for operating the computing system 1020. For example, the memory device 1020 may be implemented by a dynamic random access memory (DRAM), a mobile DRAM, a static random access memory (SRAM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc. The storage device 1030 may include a solid state drive, a hard disk drive, a CD-ROM, etc. The input/output device 1040 may include an input device, such as a keyboard, a mouse, a keypad, etc., and an output device, such as a printer, a display device, etc. The power supply 1050 may supply power to the computing device 1000.

The image sensor 1060 may be coupled to the processor 1010 via the buses or other communication links. As described above, the image sensor 1060 may generate accurate image data using an offset canceling circuit or a sampling circuit. The image sensor 1060 and the processor 1010 may be integrated in one chip, or may be implemented as separate chips. The computing system 1000 may be any computing system including the image sensor 1060. For example, the computing system 1000 may include a digital camera, a mobile phone, a smart phone, a personal digital assistant (PDA), a portable multimedia player (PMP), etc.

FIG. 36 is a block diagram illustrating an example of an interface used in a computing system of FIG. 35.

Referring to FIG. 36, a computing system 1100 may use or support a MIPI interface, and may include an application processor 1110, an image sensor 1140 and a display device 1050. A CSI host 1112 of the application processor 1110 may perform a serial communication with a CSI device 1141 of the image sensor 1140 using a camera serial interface (CSI). In some embodiments, the CSI host 1112 may include a deserializer DES, and the CSI device 1141 may include a serializer SER. A DSI host 1111 of the application processor 1110 may perform a serial communication with a DSI device 1151 of the display device 1150 using a display serial interface (DSI). In some embodiments, the DSI host 1111 may include a serializer SER, and the DSI device 1151 may include a deserializer DES.

The computing system 1100 may further include a radio frequency (RF) chip 1160. A PHY 1113 of the application processor 1110 may perform data transfer with a PHY 1161 of the RF chip 1160 using a MIPI DigRF. The PHY 1113 of the application processor 1110 may include a DigRF MASTER 1114 for controlling the data transfer with the PHY 1161 of the RF chip 1160. The computing system 1100 may further include a global positioning system (GPS) 1120, a storage device 1170, a microphone 1180, a DRAM 1185 and a speaker 1190. The computing system 1100 may communicate with external devices using an ultra wideband (UWB) communication 1210, a wireless local area network (WLAN) communication 1220, a worldwide interoperability for microwave access (WIMAX) communication 1230, etc. The inventive concepts may not be limited to configurations or interfaces of the computing systems 1000 and 1100 illustrated in FIGS. 35 and 36.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

That which is claimed:

1. An offset canceling circuit, comprising:
    a decoupling capacitor having a first electrode coupled to a unit cell and a second electrode, the unit cell being configured to output one of a reset voltage and a data voltage based on a state of the unit cell;
    a buffer coupled to the second electrode; and
    a feedback circuit coupled to the second electrode and an output terminal of the buffer, the feedback circuit configured to receive a reference voltage, and to provide the second electrode with the reference voltage to store charge corresponding to a first voltage in the decoupling capacitor, the first voltage corresponding to a voltage difference between the reset voltage and the reference voltage.

2. The offset canceling circuit of claim 1, wherein the buffer outputs a second voltage corresponding to a voltage difference between the data voltage and the first voltage when the unit cell outputs the data voltage.

3. An offset canceling circuit, comprising:
    a decoupling capacitor that is configured to receive an output voltage from a unit cell, the output voltage being one of a reset voltage and a data voltage based on a state of the unit cell;
    a buffer having an input terminal coupled to the decoupling capacitor and an output terminal; and
    a feedback circuit that is coupled between the output terminal of the buffer and the input terminal of the buffer and is configured to receive a reference voltage;
    wherein the buffer is configured to output the reference voltage when the unit cell output voltage is the reset voltage and the buffer is configured to output a voltage corresponding to the data voltage minus the voltage drop across the decoupling capacitor from the unit cell to the buffer.

* * * * *